US009975532B2

(12) United States Patent
Matsunaga et al.

(10) Patent No.: US 9,975,532 B2
(45) Date of Patent: May 22, 2018

(54) MASTER CYLINDER APPARATUS

(71) Applicants: NISSIN KOGYO CO., LTD., Ueda-shi, Nagano (JP); HONDA MOTOR CO., LTD., Minato-ku, Tokyo (JP)

(72) Inventors: Yoshiteru Matsunaga, Ueda (JP); Motoyasu Nakamura, Ueda (JP); Kazuaki Murayama, Wako (JP)

(73) Assignees: Autoliv Nissin Brake Systems Japan Co., Ltd., Nagano (JP); Honda Motor Co., Ltd., Tokyo (JP)

( * ) Notice: Subject to any disclaimer, the term of this patent is extended or adjusted under 35 U.S.C. 154(b) by 331 days.

(21) Appl. No.: 14/389,413

(22) PCT Filed: Mar. 29, 2013

(86) PCT No.: PCT/JP2013/059720
§ 371 (c)(1),
(2) Date: Sep. 30, 2014

(87) PCT Pub. No.: WO2013/147250
PCT Pub. Date: Oct. 3, 2013

(65) Prior Publication Data

US 2015/0158474 A1 Jun. 11, 2015

(30) Foreign Application Priority Data

Mar. 30, 2012 (JP) ................................ 2012-083299

(51) Int. Cl.
*B60T 17/00* (2006.01)
*B60T 11/00* (2006.01)
(Continued)

(52) U.S. Cl.
CPC ............... *B60T 11/20* (2013.01); *B60T 7/042* (2013.01); *B60T 8/368* (2013.01); *B60T 8/4081* (2013.01);
(Continued)

(58) Field of Classification Search
CPC . B60T 8/343; B60T 11/20; B60T 8/34; B60T 8/341; B60T 8/3645; B60T 8/3675; B60T 8/368; B60T 8/3685
(Continued)

(56) References Cited

U.S. PATENT DOCUMENTS 4,705,324 A 11/1987 Kervagoret
5,011,238 A * 4/1991 Brown, Jr. ............ B60T 8/3635 303/113.2
(Continued)

FOREIGN PATENT DOCUMENTS

DE 39 30 384 C1 11/1990
DE 195 23 783 A1 1/1996
(Continued)

OTHER PUBLICATIONS

JP2007-176277 Machine Translation.*
(Continued)

*Primary Examiner* — Thomas E Lazo
*Assistant Examiner* — Dustin T Nguyen
(74) *Attorney, Agent, or Firm* — Carter Blackman & Associates, P.C.; William D. Blackman; Joseph P. Carrier

(57) ABSTRACT

Provided is a master cylinder apparatus with a reduced size enabled by simplifying the fluid passageway configuration. A master cylinder apparatus which includes a base member containing a fluid passageway for brake fluid and to which an operation of a brake operator is inputted is provided with: a master cylinder installed on the base member to generate a fluid pressure based on an input produced by operating the
(Continued)

brake operator; and at least two solenoid valves attached to one side of the base member to open or close the fluid passageway. The two solenoid valves are disposed symmetrically with respect to a central axis along the axial direction of the master cylinder as viewed from a direction perpendicular to the one side of the base member.

5 Claims, 22 Drawing Sheets

(51) Int. Cl.

| | |
|---|---|
| ***B60T 11/20*** | (2006.01) |
| ***B60T 11/16*** | (2006.01) |
| ***B60T 8/36*** | (2006.01) |
| ***B60T 8/40*** | (2006.01) |
| ***B60T 7/04*** | (2006.01) |
| ***B60T 13/14*** | (2006.01) |
| ***B60T 13/66*** | (2006.01) |
| ***B60T 13/68*** | (2006.01) |

(52) U.S. Cl.
CPC ............. *B60T 11/16* (2013.01); *B60T 13/146* (2013.01); *B60T 13/662* (2013.01); *B60T 13/686* (2013.01)

(58) Field of Classification Search
USPC ........................... 303/119.3, 119.1; 137/884
See application file for complete search history.

(56) References Cited

U.S. PATENT DOCUMENTS 5,567,021 A * 10/1996 Gaillard .................. B60T 7/042 188/358
5,607,207 A * 3/1997 Nagashima ............. B60T 8/368 188/356
5,711,151 A 1/1998 Engfer
5,988,767 A 11/1999 Inoue
7,311,365 B2 12/2007 Nohira
2002/0149259 A1 * 10/2002 Otomo .................... B60T 8/367 303/3
2004/0113488 A1 * 6/2004 Sekihara ................. B60T 8/368 303/119.3
2004/0140714 A1 * 7/2004 Wagu ...................... B60T 7/122 303/119.1
2005/0067894 A1 3/2005 Nohira
2007/0018498 A1 * 1/2007 Nakazawa .............. B60T 8/368 303/119.3
2007/0228820 A1 * 10/2007 Nakamura ............ B60T 8/3225 303/119.3
2008/0036295 A1 * 2/2008 Sakai ...................... B60T 8/368 303/116.4
2008/0048492 A1 * 2/2008 Sakai ........................ B60T 8/26 303/113.1
2010/0032597 A1 * 2/2010 Beer ....................... B60T 8/368 251/129.01

FOREIGN PATENT DOCUMENTS

DE 44 35 623 A1 4/1996
EP 0168286 A1 1/1986
JP H10-35453 A 2/1998
JP 2001-039284 A 2/2001
JP 2001-047990 A 2/2001
JP 2001039284 * 2/2001 ................ B60T 8/34
JP 2004-082906 A 3/2004
JP 2005-119640 A 5/2005
JP 2006-117076 A 5/2006
JP 2007-099058 A 4/2007
JP 2007-176277 * 7/2007 ............ B60T 8/4081
JP 2007176277 * 7/2007 ............ B60T 8/4081
JP 2011-063061 A 3/2011

OTHER PUBLICATIONS

JP2001039284 Machine Translation.*
JP2007176277 eSpacenet Machine Translation.*
Extended European search report issued over the corresponding EP Patent Application 13768769.5 dated Nov. 4, 2015.
Office Action issued over the corresponding Chinese Patent Application 201380017154.5.

* cited by examiner

A1
20
40a
51
40
52
21
23
5a
26a
8a
7a
4
26
4a
7
8
5
6
6a
12
12a
30
16
14
32
141
151
65b
146
13
145
155
152
142
31
14a
153
143
68d
156
15c
15a
10
15
15b
15d
11

10
12
12a
13
141
30
65b
146
145
66b
15
15c
66c
66a
15a
63a
63
63c
15b
15d
11a,1
11b,2
65c
70
67c
71
142
65
63c
68a
65a
67b
30
143
68d
68c
68e
68
68b
63b
Up
Rear
Front
Down 10
11a,1
11b,2
12
12a
70
13
16
30,141
71
142
152
68a
65b
68
30
143
64
68b
153
64b
61a
68c
68d
63c
68e
63a
64d
14a
15
15d
63b
15c
15b
15a
64a
64c
Right
Rear
Front
Left 10
12
12a
11b,2
11a,1
13
62
65c
67c
70
70a
71
16
30
61b
61a
61
141
65b
65a
67b
68a
142
68
68b
146
143
68d
68c
30
64e
66
66e
66d
15a
16
66b
145
63b
16
15c
66a
63a
15b
63c
15d
Up
Down
Front
Rear
Left
Right 10
12
12a
12a
12a
13
13
14a
15
15a
15b
15c
15d
16
16
30
30
63
63a
63b
63c
64c
64d
64e
61a
65
65a
65b
65c
66
66a
66b
66e
67b
67c
68
68a
68b
68c
68d
68e
70
71
141
142
143
145
146
11a,1
11b,2
(Secondary side)
Up
Rear
Right
Left
Front
(Primary side)
Down 10
12a
16
141
65a
30
66d
66 66b
16
66c
15c
145
66a
63a
14a
30,143
63c
16
15d
63b
15a
15b
65b
67a
61
64c
15
13
66e
65c
13
62
64e
61b
64d
11a,1
61a
12
12a
12a
11b,2
Up
Right
Front
Rear
Left
Down 10
11b,2
11a,1
12
12a
12a
12a
13
15
15b
15d
30
61a
63b
63c
64
64a
64b
64d
64e
65a
67b
67c
68a
68b
68c
68d
68e
70
70a
142
143
Up
Down
Left
Right
Front
Rear 10
12
12a
12a
12a
70
71
142
141
30
30
145
146
143
16
16
11a,1
11b,2
68a
68b
65a
67b
68c
63a
63b
63c
66b
66a
15c
15a
15
13
64
64a
64b
64c
64d
64e
15b
15d
Up
Down
Front
Rear
Right
Left 10
12
142
30A
32
141
31
145
14a
144
14
32
30A
31
143
15

MASTER CYLINDER APPARATUS

TECHNICAL FIELD

The present invention relates to a master cylinder apparatus into which an operation on a brake operator is inputted.

BACKGROUND ART

Conventionally, as such a kind of the master cylinder apparatus, there is a known master cylinder apparatus in a vehicle brake system for controlling a brake fluid pressure applied to wheel brakes of a vehicle (automobile) (for example, see Patent document 1).

The vehicle brake device includes a base including a master cylinder and fluid passages therein and a solenoid valve for opening and closing the fluid passages, and parts such as a pressure sensor for detecting a magnitude of the brake fluid pressure, etc. are attached to the base.

PRIOR ART

Patent Document

PATENT DOCUMENT 1: JP2007-99058

SUMMARY OF INVENTION

Problem to be Solved by Invention

Generally, the master cylinder apparatus is disposed inside the engine room having strict restriction regarding layout. Accordingly, there is a request for further saving a space because it is necessary for down-sizing.

On the other hand, the master cylinder apparatus has such a structure that the master cylinder and the solenoid valve, which require space, are mounted. Accordingly, there is a problem in that there is a restriction in forming the base in a small size. Further there is a problem in that the fluid passages become complicated in accordance with the arrangement.

The present invention is provided in consideration of the above-described points and aims to provide a master cylinder apparatus capable of down-sizing by simplifying the structure of the fluid passages.

Means for Solving Problem

The invention created to achieve the object provides a master cylinder apparatus, including a base member, to which an operation of a brake operator is inputted, the base member including a flow passage for a brake fluid therein, comprising:

a master cylinder that is provided to the base and generates a fluid pressure when the operation of the brake operator is inputted thereto;

at least two solenoid valves that are mounted on one surface of the base and opens and closes the flow passage, wherein the two solenoid valves are arranged symmetrically across a center axis in an axial direction of the master cylinder when the viewed from a direction vertical to the one surface of the base.

According to the master cylinder according to the present invention, the two solenoid valves are arranged symmetrically across the center axis of the master cylinder in the axial direction when the master cylinder is viewed from the direction vertical to the one surface of the base. Accordingly, it is possible to form a short flow passage connecting the master cylinder to two solenoid valves. This simplifies the structure of the flow passage and provides down-sizing.

Further, the present invention provides the master cylinder comprising a tandem type of master cylinder, wherein the two solenoid valves for the master cylinder opens and close two main flow passages connected to the master cylinder.

According to the master cylinder of the present invention, though the master cylinder is of a tandem type, the two main flow passages connected to the master cylinder can be shortened, so that the structure of the flow passage can be simplified and thus down-sized.

Further, the present invention provides the master cylinder, wherein the one surface of the base includes a plurality of the valve mounting holes corresponding to the number of the solenoid valves, and wherein a hollow part is provided around at least one of the valve mounting holes to face an outer circumferential surface of a coil for driving the solenoid valve on the one surface of the base.

According to the master cylinder of the present invention, a mounting position of the solenoid valve can be changed by the depth of the hollow part. This enhances a degree of freedom in forming the flow passage because the formation position of the flow passage connected to the solenoid valve can be changed. This can simplify the structure of the flow passage and thus provides down-sizing.

Further, according to the invention, the number of the solenoid valves provided to the base is three, wherein a pressure sensor is provided on the one surface of the base for detecting a brake fluid pressure in the flow passage, and the three solenoid valves and the pressure sensor are arranged so as to form corners of a quadrilateral.

According to the master cylinder of the present invention, two solenoid valves are arranged opposite to each other across the center axis of the master cylinder when the master cylinder is viewed from a direction vertical to the one surface of the base, wherein two electromagnetic valves are arranged on one side, and the solenoid valve and the pressure sensor are arranged on the other side. This shortens the flow passages relative to the case where these are aligned in line. The arrangement is made at a high density. As the result, down-sizing is provided.

The present invention provides the master cylinder apparatus further comprising a stroke simulator arranged in parallel to the master cylinder, the stroke simulator spuriously applying an operation reaction force of the brake operator to the brake operator, wherein one of the three solenoid valves is a solenoid valve opening and closing the flow passage to the stroke simulator.

According to the master cylinder apparatus of the present invention, in the structure in which the stroke simulator and the electromagnetic value opening and closing the flow passage to the stroke simulator, the structure of the flow passage is simplified and thus down-sized.

Advantageous Effect of Invention

According to the present invention, a master cylinder capable of down-sizing by simplifying the structure of the fluid passages can be obtained.

BRIEF DESCRIPTION OF DRAWINGS

FIGS. 4A and 4B are drawings illustrating a base of the master cylinder in which FIG. 4A is a right side view and FIG. 4B is a rear view.

FIGS. 5A and 5B are drawings illustrating the base of the master cylinder in which FIG. 5A is a top view and FIG. 5B is a bottom view.

MODES FOR CARRYING OUT INVENTION

Figure 1:
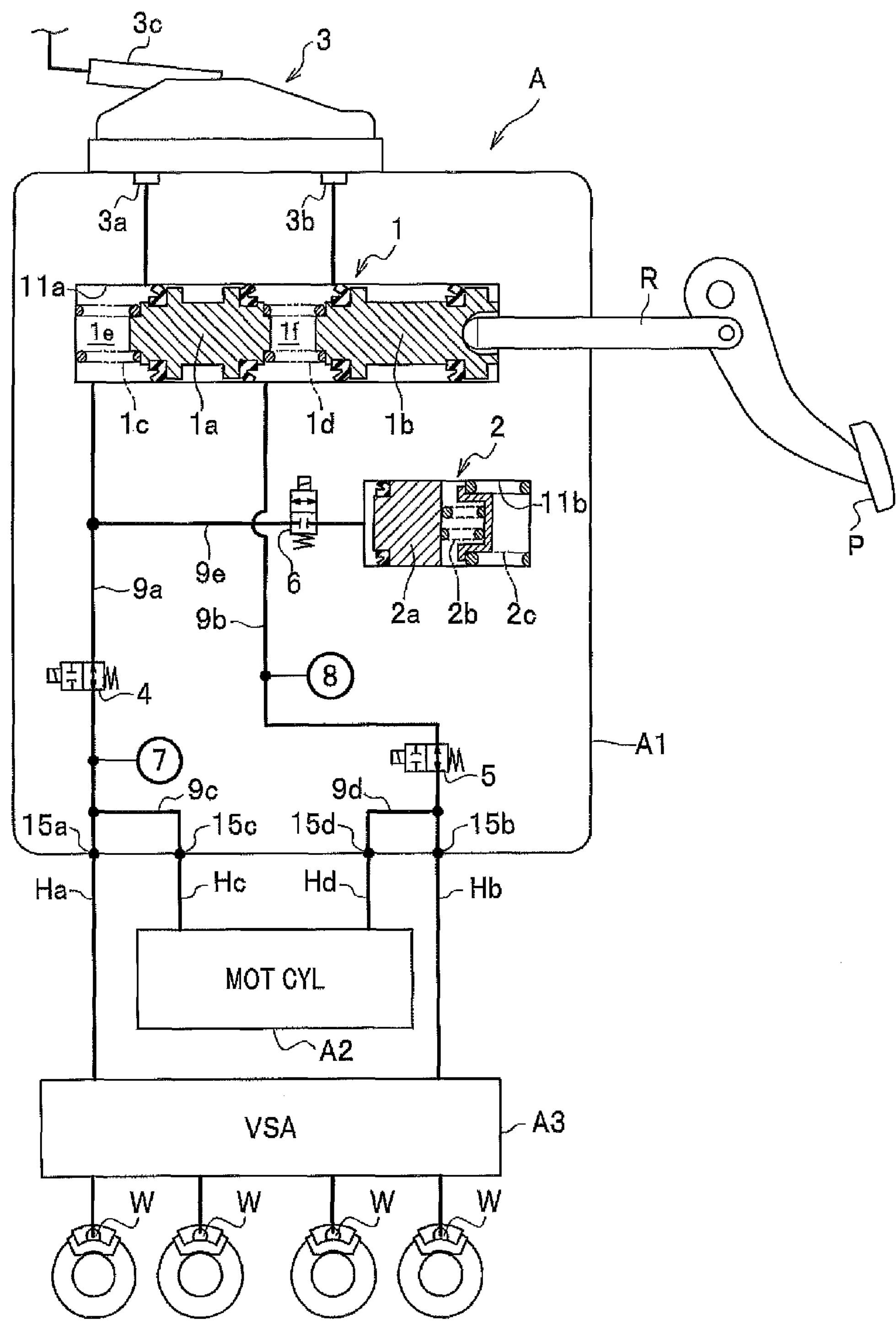
FIG. 1 is a general block diagram of a vehicle brake system having a master cylinder apparatus according to embodiments of the present invention.

A vehicle brake system A shown in FIG. 1 includes both the brake system of a brake-by-wire system which operates upon operation of a power plant (engine and motor, etc) and a hydraulic type of brake system operating upon emergency or stop of the power plant, that is, includes a master cylinder apparatus A1 generating a brake fluid pressure by a pressure force on a brake pedal P (brake controller) and a motor cylinder device A2 for generating the brake fluid pressure using an electric motor, and a Vehicle Stability Assist device A3 (referred to as "hydraulic controller A3") for assistance to stabilize behavior of the vehicle. A master cylinder apparatus A1 generates a brake fluid pressure by a depression force on a brake pedal P (brake operator). The master cylinder apparatus A1, the motor cylinder device A2, and the hydraulic controller A3 are configured as separated units and connected through external tubes.

The vehicle brake system A can be also mounted on hybrid vehicles further using at least a motor and electric/fuel cell vehicle using only at least a motor as a power source in addition to the vehicles using an engine (internal combustion engine) as a power source.

The master cylinder apparatus A1 includes a tandem type of master cylinder 1, a stroke simulator 2, a reservoir 3, normally open cutoff valves (solenoid valves) 4, 5, a normally closed cutoff valve (solenoid valve) 6, pressure sensors 7, 8, main hydraulic passages 9*a*, 9*b*, connecting hydraulic passages 9*c*, 9*d*, and a dividing hydraulic passage 9*e*.

The tandem type of master cylinder 1 is a device for converting a depressing force on the brake pedal P into a brake fluid pressure and includes a first piston 1*a* disposed on a bottom wall side of a first cylinder hole 11*a*, a second piston 1*b* connected to a push rod R, a first return spring 1*c* disposed between the first piston 1*a* and a bottom wall of the first cylinder hole 11*a*, and a second return spring 1*d* disposed between the first return spring 1*c* and the second return spring 1*d*. The second piston 1*b* is connected to the brake pedal P through the push rod R. Both the pistons 1*a*, 1*b* slide in response to a depression force on the brake pedal P and pressurize brake fluids in pressure chambers 1*e*, 1*f*. The pressure chambers 1*e*, 1*f* are communicated with the main hydraulic passages 9*a*, 9*b*, respectively. Pressure chambers 1*e*, 1*f* have the same brake fluid pressure.

The stroke simulator 2 is a device for generating a simulated operation reaction force and includes a piston 2*a* in a second cylinder hole 11*b*, and two return springs 2*b*, 2*c* having large and small sizes for actuating the pistons 2*a*, 2*a*, respectively. The stroke simulator 2 communicates with the pressure chamber 1*e* through the main hydraulic passage 9*a* and the dividing hydraulic passage 9*e* and operates by the brake fluid pressure generated in the pressure chamber 1*e*.

The reservoir 3 is a container for storing a brake fluid and includes fill openings 3*a*, 3*b* connected to the tandem type of master cylinder 1 and a tube-connection opening 3*c* connected to a hose extending from a main reservoir (not shown).

The normally open cutoff valves 4, 5 are devices for opening and closing the main hydraulic passages 9*a*, 9*b* respectively, and the both comprise normally open type of solenoid valves, respectively. One of them, i.e., the normally open cut off valve 4 opens and closes the main hydraulic passage 9*a* in a section from a joint between the main hydraulic passage 9*a* and the dividing hydraulic passage 9*e* to a joint between the main hydraulic passage main hydraulic passage 9*a* and the connecting hydraulic passage 9*c*. The other of them, i.e., the normally open cutoff valve 5 opens and closes a main hydraulic passage 9*b* on an upstream side of a joint between the main hydraulic passage 9*b* and a connecting hydraulic passage 9*d*. The normally closed cutoff valve 6 opens and closes the dividing hydraulic passage 9*e* and comprises a normally closed type solenoid valve.

Figure 3:
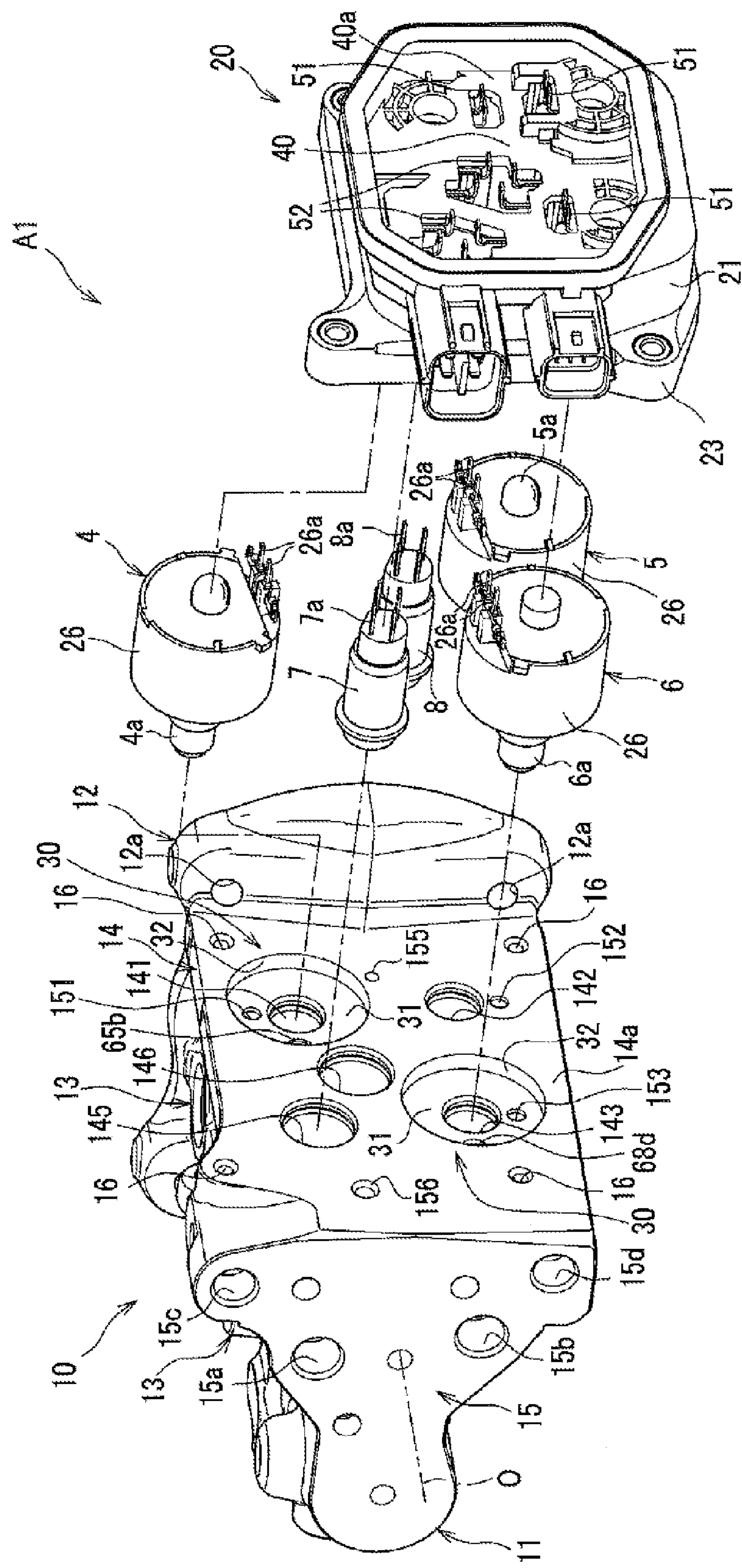
FIG. 3 is an exploded perspective view of the master cylinder apparatus.

As shown in FIG. 3, the normally open cutoff valve 4 includes a solenoid valve 4*a*, a coil 26 driving the solenoid valve 4*a*. The normally open cutoff valve 5 includes a solenoid valve 5*a* and the coil 26 for driving the solenoid valve 5*a*. Further, a normally closed cut-off valve 6 includes a solenoid valve 6*a* and the coil 26 for driving the solenoid valve 6*a*. In the embodiment, the coils 26 are commonly used for each valve.

The coil 26 has a substantially hollow cylindrical shape and has a center through hole 260 into which any one of the solenoid valves 4*a*, 5*a*, and 6*a* (only the solenoid valves 4*a* and 5*a* are shown) is inserted. The coil 26 includes a bobbin 261 made of plastic on which a winding wire M is wound and a yoke 262 enclosing the bobbin 261 to form a magnetic path.

The bobbin 261 includes a terminal holding part 263 and a positioning protrusion 264. The terminal holding part 263 is provided with a connecting terminal 26*a*. The positioning protrusion 264 is protrusively formed toward a side opposite to a housing 20 side (side of a base 10) from a bottom of the bobbin 261. Formed on the yoke 262 is an engaging part 266 having a hollow cylindrical shape engageable with the positioning protrusion 264. Further, provided at a lower end of the yoke 262 is a skirt part 268 extending along the solenoid valves 4*a*, 5*a*, 6*a* (only the solenoid valves 4*a* and 5*a* are shown).

Figure 6:
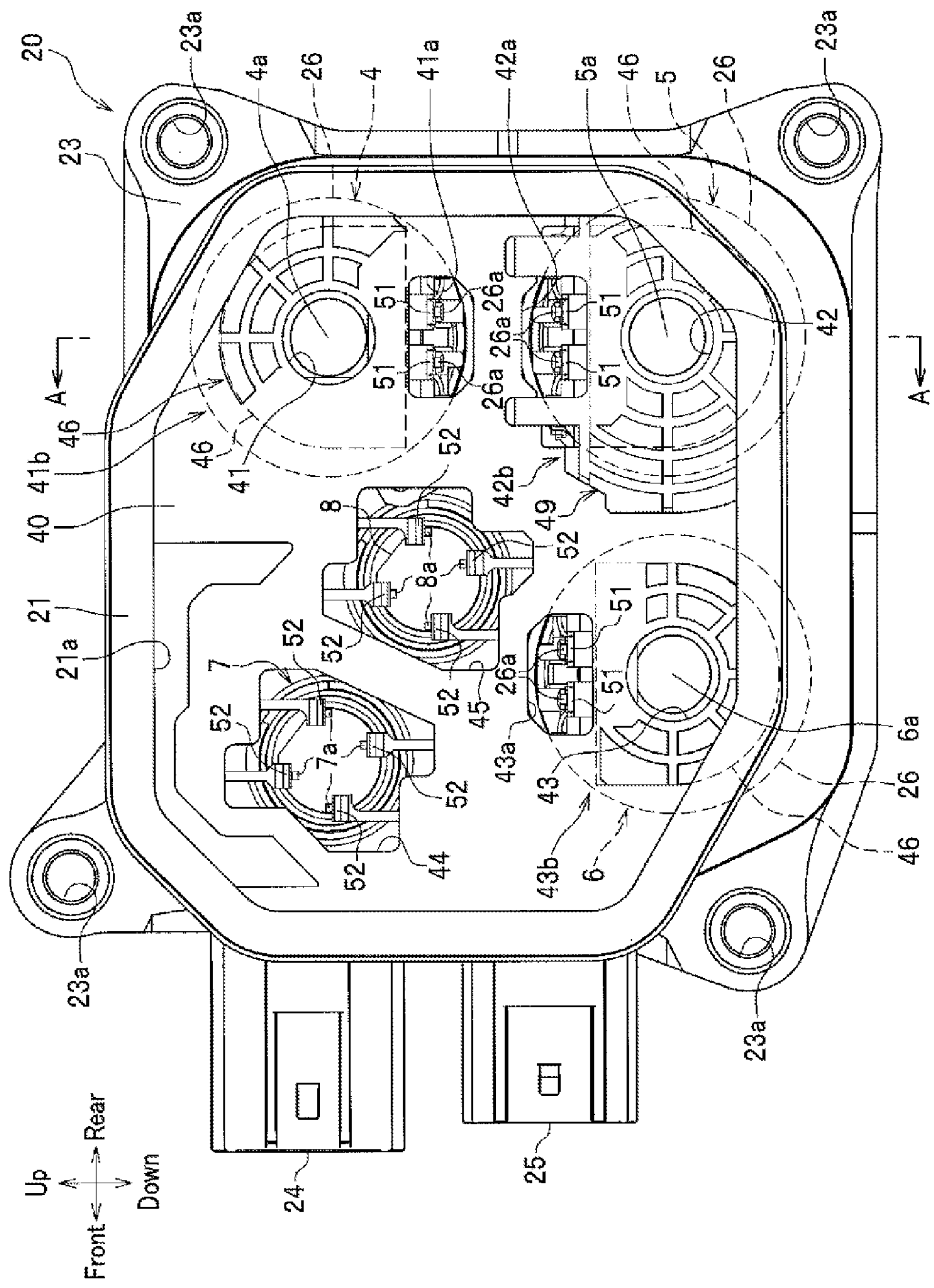
FIG. 6 is a right side view illustrating the housing with which parts such as a normally open cutoff valve are assembled.

Pressure sensors 7, 8 are devices for detecting magnitudes of a break hydraulic pressures and mounted in sensor openings 44, 45 (see FIG. 6) communicating with main hydraulic passages 9*a*, 9*b* (see FIG. 6). On the other hand, the pressure sensor 7 is arranged on a side downstream from the normally open cutoff valve 4 and detects the brake fluid pressure generated in a motor cylinder device A2 in a status in which the normally open cutoff valve 4 is closed (=in a status in which the main hydraulic passage 9*a* is cut out). The other pressure sensor 8 is arranged on a side upstream from the normally open cutoff valve 5 and detects the brake fluid pressure generated in a master cylinder 1 in a status in which the normally open cutoff valve 5 is closed (=in a status in which a main hydraulic passage 9*b* is closed). The data obtained by the pressure sensors 7, 8 is sent to an electronic control unit (ECU) (not shown).

The pressure sensors 7, 8 are provided with terminals 7*a*, 8*a* as shown in FIG. 3.

The main hydraulic passages 9*a*, 9*b* are hydraulic passages starting from the tandem type of master cylinder 1 as shown in FIG. 1. The output ports 15*a*, 15*b*, which are end points of the main hydraulic passages 9*a*, 9*b*, are connected to the tube members Ha, Hb extending to the hydraulic pressure control device A3, respectively.

The connecting hydraulic passages 9*c*, 9*d* are hydraulic passages extending from input ports 15*c*, 15*d* to the main hydraulic passages 9*a*, 9*b*, respectively. The input ports 15*c*, 15*d* are connected to tube members Hc, Hd extending to the motor cylinder device A2, respectively. More specifically, the brake fluid pressure generated by the motor cylinder device A2 passes through the master cylinder apparatus A1 and applied to a hydraulic pressure control device A3.

A division hydraulic passage 9*e* is branched off from one, i.e., the main hydraulic passage 9*a*, and extends to a stroke simulator 2.

The master cylinder apparatus A1 communicates with the hydraulic controller A3 through the tube members Ha, Hb, and the brake fluid pressures generated by the tandem type of master cylinder 1 are inputted, in an open valve status of the normally open cutoff valves 4, 5, into the hydraulic controller A3 through the main hydraulic passages 9*a*, 9*b* and the tube members Ha, Hb.

The motor cylinder device A2 includes (not shown) a slave piston slidable in the slave cylinder, an actuator mechanism including an electric motor and a drive force transmitting unit, and a reservoir for storing the brake fluid in the slave cylinder.

The electric motor operates on the basis of the signal from an electronic control unit (not shown). The drive force transmitting unit converts a rotational drive force of the electric motor into a reciprocating motion and transmits the converted force to the slave piston. The slave piston slides in the slave cylinder in response to the drive force of the electric motor to pressurize the brake fluid in the slave cylinder.

The brake fluid pressure generated by the motor cylinder device A2 is inputted, as described above, into the master cylinder apparatus A1 through the tube members Hc, Hd and into the hydraulic controller A3 through the tube members Ha, Hb. The reservoir is connected to a hose extending from a main reservoir (not shown).

The hydraulic controller A3 includes such a configuration as to conduct antilock braking control (ABS control) for suppressing slip of wheels and side skidding control and traction control for stabilizing behavior of the vehicle and is connected to a wheel cylinders W, W, - - - through tube members. In addition, though not shown in Figures, the hydraulic controller A3 includes a hydraulic unit in which a solenoid valve and a pump are installed, a motor for driving the pump, an electronic control unit for controlling the solenoid valve and the motor, etc.

Next, an operation of a vehicle brake system A will be generally described. In a normal status in which the vehicle brake system A operates normally, the normally open cutoff valves 4 and 5 become in valve-closing statuses, so the normally closed cutoff valve 6 becomes in a valve-opening status. When the brake pedal P is operated in such a status, the brake fluid pressure generated by the tandem type of master cylinder 1 is transmitted not to the wheel cylinder W but to the stroke simulator 2, where the piston 2*a* is displaced, which allows a stroke of the brake pedal P and a simulated operation reaction force is applied to the brake pedal P.

Further, when the depression on the brake pedal P is detected by a stroke sensor (not shown), etc., an electric motor of the motor cylinder device A2 is driven, so that displacement of the slave piston pressurizes the brake fluid in the cylinder.

The electronic control unit (not shown) compares the brake fluid pressure outputted by the motor cylinder device A2 (brake fluid pressure detected by the pressure sensor 7) with the brake fluid pressure (brake fluid pressure) outputted by the tandem type of master cylinder 1 (brake fluid pressure detected by the pressure sensor 8) and controls the rotation speed, etc. of the electric motor on the basis of the comparing result.

The brake fluid pressure generated by the motor cylinder device A2 is transmitted to the wheel cylinders W, W, - - - through the hydraulic controller A3, so that braking forces are applied to the wheels by operation of cylinders W, respectively.

Further, in such a status that the motor cylinder device A2 does not operate (for example, in a case where an electric power cannot be obtained or emergency case), both the normally open cutoff valves 4, 5 become in valve-open statuses, so that the normally closed cutoff valve 6 becomes in a valve-closing status. Accordingly, the brake fluid pressure generated in the tandem type of master cylinder 1 is transmitted to the wheel cylinders W, W, - - - .

Next, a more specific structure of the master cylinder apparatus A1 will be described.

Figure 2A:
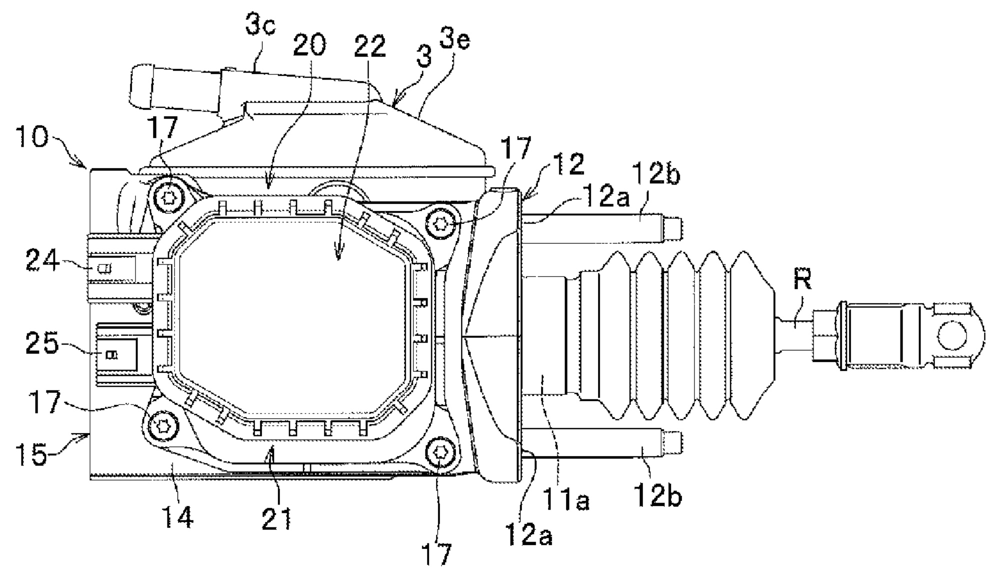
FIG. 2A is a right side view of the master cylinder apparatus (brake fluid pressure device, and FIG. 2B is a front view of the master cylinder apparatus.
Figure 2B:
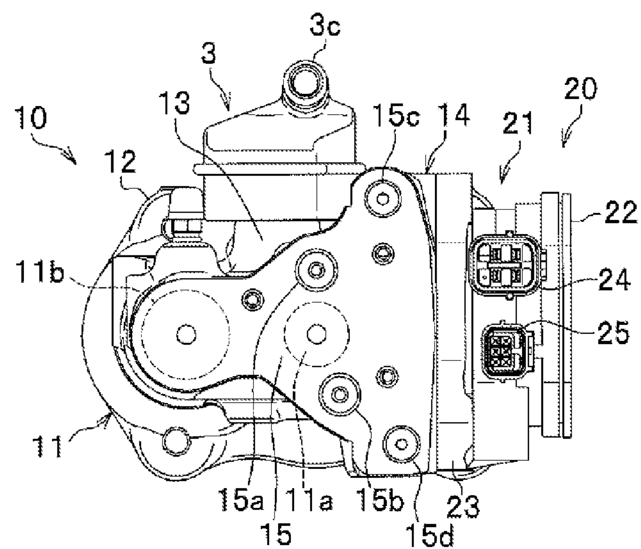

The master cylinder apparatus A1 according to the embodiment is formed by mounting above-described various parts on an inside or an outside of the base 10 shown in FIGS. 2A and 2B and covering electric parts operating with electric power (the normally open cutoff valves 4, 5, the normally close cutoff valve 6, and the pressure sensors 7, 8 (see FIG. 1) with a housing 20. Further, it is also possible that mechanical parts, etc. are housed in the housing 20.

The base 10 is a casting with an aluminum alloy and includes a cylinder unit 11 (see FIG. 2B, the same shall apply hereinafter), a vehicle fixing unit 12, a reservoir mounting part 13 (see FIG. 2B, the same is applied hereinafter), a housing mounting part 14, and the tube connecting part 15. In addition, inside the base 10, through holes forming the main hydraulic passages 9*a*, 9*b*, the dividing hydraulic passage 9*e* (not shown), etc. are formed. Details of the hydraulic pressure passage (flow passage) will be described later.

In the cylinder unit 11, the first cylinder hole 11*a* for the master cylinder and the second cylinder hole 11*b* for the stroke simulator (both shown with broken lines in FIG. 2B) are formed. Both the cylinder holes 11*a*, 11*b* have hollow cylindrical shapes with bottoms and open at the vehicle fixing unit 12 and extend toward the tube connecting part 15. Inserted into the first cylinder hole 11*a* are parts forming the master cylinder 1 (see FIG. 1), (the first piston 1*a*, the second piston 1*b*, the first return spring 1*c* and the second return spring 1*d*). Inserted into the second cylinder hole 11*b* are parts forming the stroke simulator 2 (the piston 2*a*, and the return springs 2*b*, 2*c*).

The vehicle fixing unit 12 is fixed to a vehicle side fixing part such as a toe board 50 (not shown). The vehicle body fixing part 12 is formed on a rear surface of the base 10 in a flange shape. At a circumferential edge part of the vehicle fixing unit 12 (a part protruding from the cylinder unit 11), a bolt insertion hole (not shown) is formed in which a bolt 12*a* (see FIG. 3) is fixed. A fixing bolt 12*b* (see FIG. 2A) is fixed in a bolt insertion through hole 12*a.*

Figure 5A:
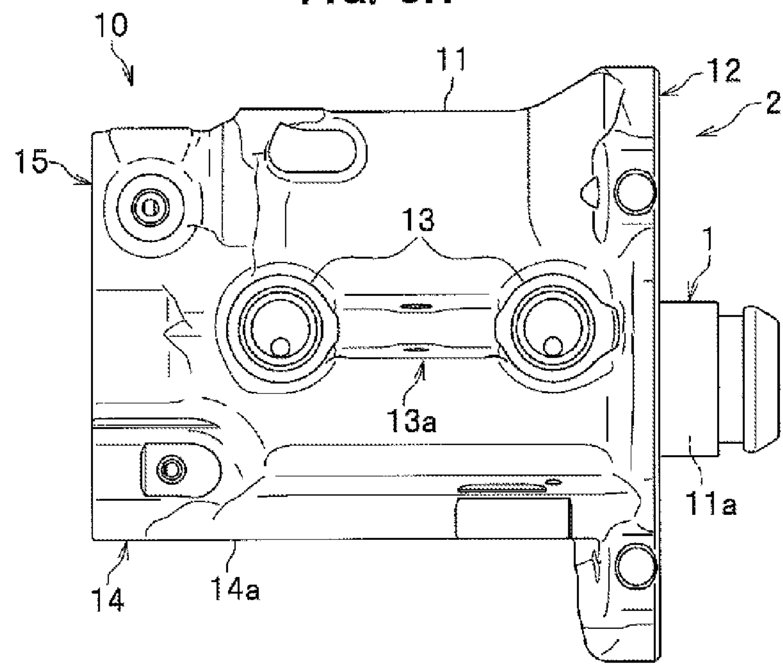

As shown in FIGS. 2A and 5A, a reservoir mounting part 13 is a part which becomes a mounting seat for the reservoir 3. Two reservoir mounting parts 13 are formed at an upper surface part of the base 10 (only one of them is shown). Mounted on the reservoir mounting part 13 is a reservoir union port. Further, the reservoir 3 is fixed to the base 10 through a connecting part 13*a* (see FIG. 5A) protrusively formed on an upper surface of the base 10.

The reservoir union port has a hollow cylindrical shape and communicates with the first cylinder hole 11*a* through a hole extending from its bottom surface toward the first cylinder hole 11*a*. The reservoir union port is connected to a fluid supply inlet (not shown) formed protrusively at a lower part of the reservoir 3, and a container body of the reservoir 3 is placed on an upper end of the reservoir union port.

A tube connecting part 15 is a part to be a tube attaching seat and as shown in FIG. 2A formed at a front part of the base 10. Formed at the tube connection part 15 are, as shown in FIG. 2B, two output ports 15*a*, 15*b* and two input ports 15*c*, 15*d*. The output ports 15*a*, 15*a* are connected to tube members Ha, Hb, respectively, (see FIG. 1), the tube members Ha, Hb extending to the hydraulic pressure control device A3. The input ports 15*c*, 15*d* are connected to the tube members Hc, Hd (see FIG. 1) extending to the motor cylinder device A2.

A housing mounting part 14 is a part to be a mounting seat for the housing 20 and has a flange shape as shown in FIG. 3. The housing mounting part 14 has a mounting surface 14*a* to which the housing 20 is attached (a plane substantially orthogonal with an axial line (the center axis O of the master cylinder 1) of the base 10).

Figure 4A:
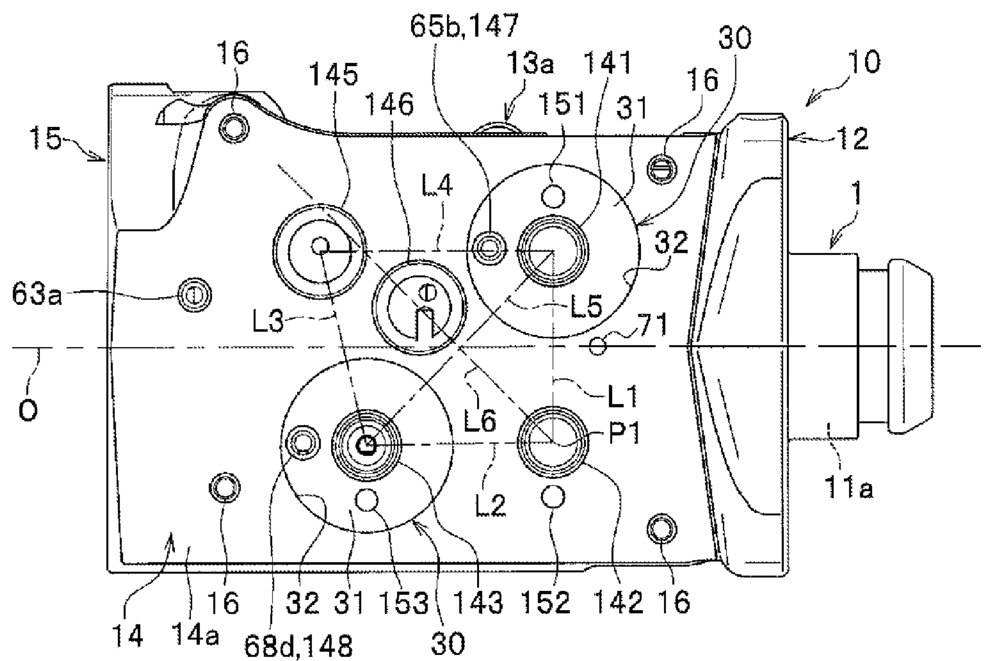
Figure 5B:
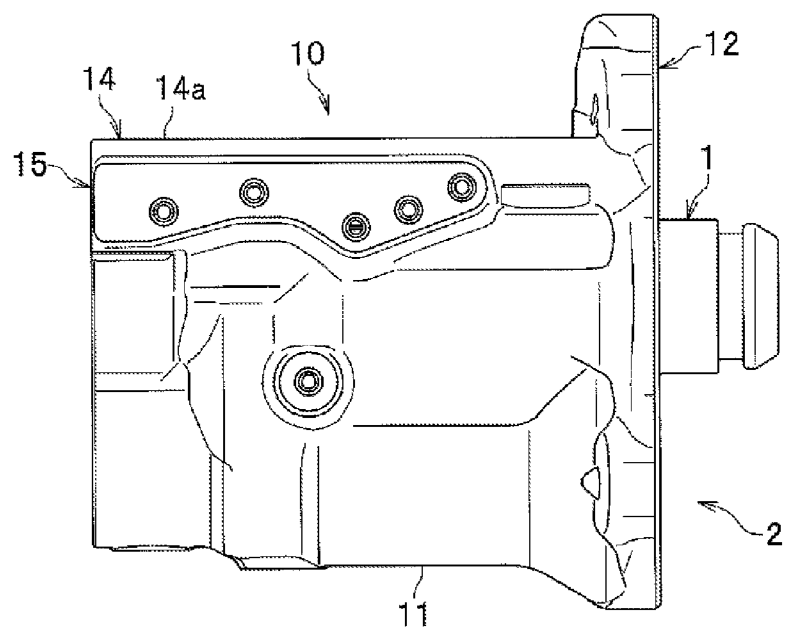

The mounting surface 14*a* is, as shown in FIG. 4A, a flat surface formed in a substantially rectangular in side view (see FIGS. 5A and 5B). At four corners of the rectangular four mounting through holes 16 for mounting the housing 20 are formed.

Further, at the mounting surface 14*a*, three valve mounting through holes 141, 142, 143 and two sensor mounting through hole 145, 146, and flow passage holes (lateral holes) 147, 148, and detent hollow parts 151, 152, 153 are formed.

Figure 9:
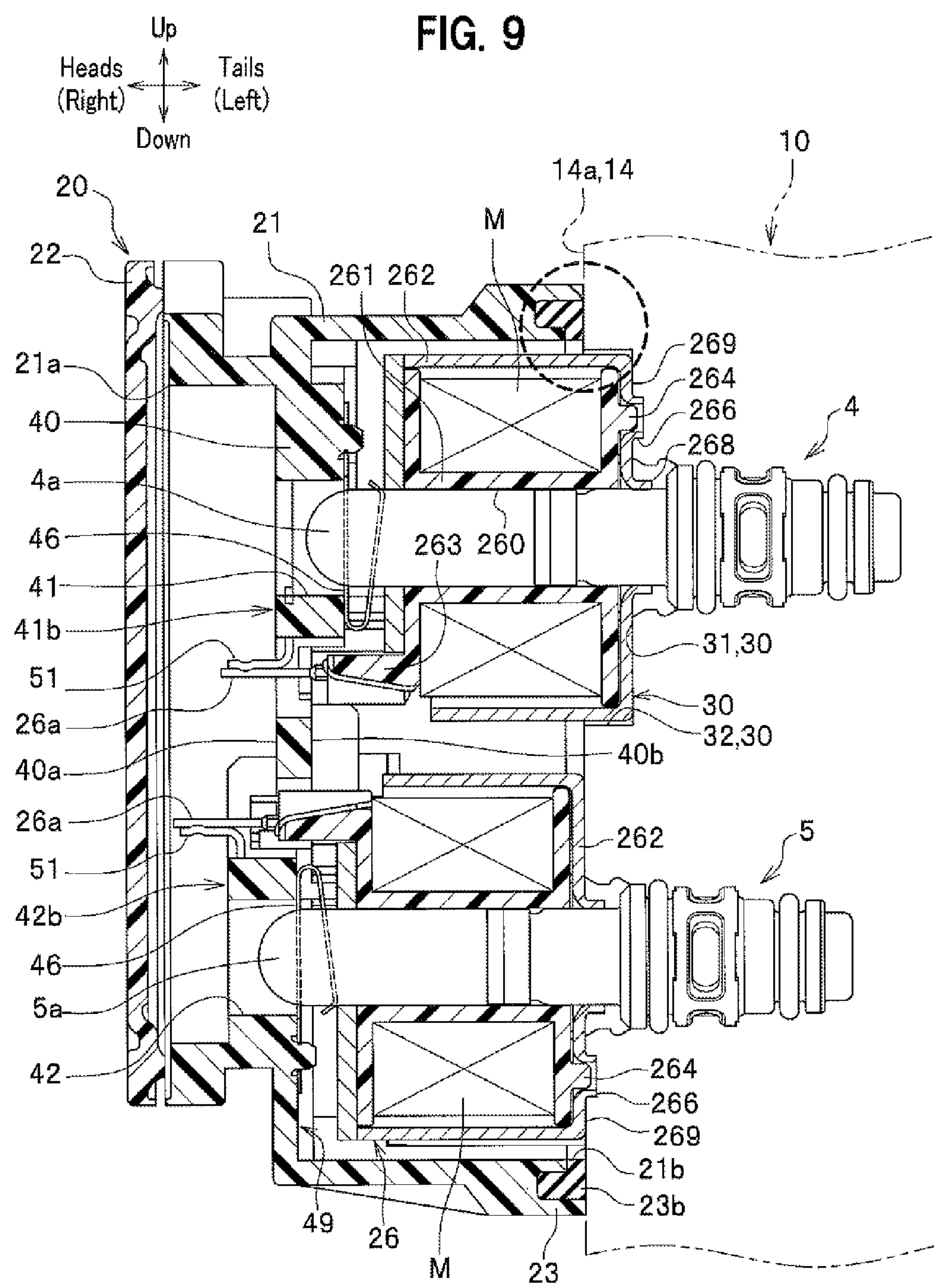
FIG. 9 is a cross section view taken along line A-A in FIG. 6.
Figure 10A:
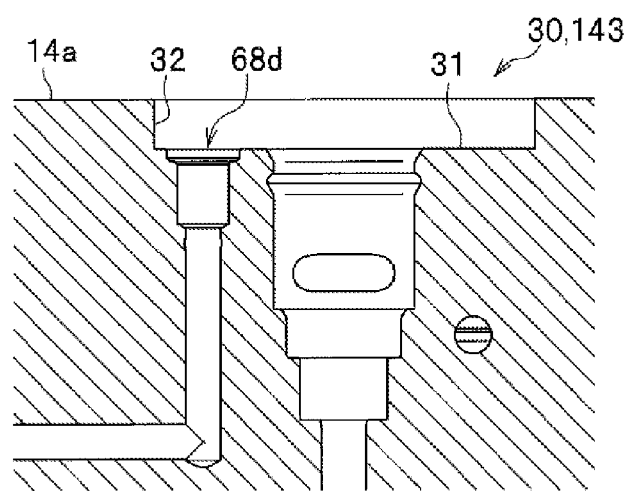
FIG. 10A is an enlarged cross section view illustrating a hollow part and FIG. 10B is an enlarged cross section view illustrating a relation between the hollow part and the coil.

Mounted into the valve-mounting through hole 141 is the normally open cutoff valve 4 for the master cylinder 1. Mounted into a valve-mounting through hole 142 is the normally open cutoff valve 5 for the master cylinder 1. Further, mounted into a valve-mounting through hole 143 is the normally closed cut-off valve 6 for the stroke simulator 2. Around the valve-mounting through holes 141, 143 out of the three valve-mounting through holes 141 to 143, hollow parts 30 formed in a counterbore shape such as to be hollowed inward of the base 10 from the mounting surface 14*a*. The valve-mounting through holes 141, 143 are hollowed toward an inside of the base 10 relative to the valve-mounting through hole 142 by one step. More specifically, the valve-mounting through hole 142 opens on a flat surface occupying most of the mounting surface 14*a*. The valve-mounting through holes 141, 143 open at a bottom surface 31 of the hollow part 30 which is hollowed relative to the flat surface by one step. The hollow part 30 has the bottom surface 31, a circumferential surface (circumferential wall, wall surface) 32 (see FIG. 10A). As shown in FIG. 9, a lower surface 269 of the coil 26 abuts the bottom surface 31. A lower outer circumferential surface 267 of the yoke 262 is placed in the circumferential surface 32 opposite to the circumferential surface 32 (see FIG. 10B). In other words, the coil 26 abuts one surface of the base 10 (the mounting surface 14*a*) inside the hollow part 30. Details in a relation between the hollow part 30 and the coil 26 will be described later.

Mounted into the two sensor mounting through holes 145, 146 are the pressure sensors 7, 8. The flow passage holes 147, 148 open at the bottom surface 31 of the hollow parts 30, respectively. Balls are pressure-inserted into the flow passage holes 147, 148 to seal the openings and swaged.

The three detent hollow parts 151 are provided near circumferences of the three valve mounting through holes 141, 142, 143, respectively. The detent hollow parts 151, 152, 153 are provided correspondingly to the positioning protrusion 264 of the coil 26 (see FIG. 9). The detent hollow parts 151, 152, 153 function as a detent hollow part for the coil 26 by engagement with the positioning protrusions 264.

The detent hollow parts 151, 153 are formed to open at the bottom surfaces 31, 31 of the hollow parts 30, 30. On the bottom surfaces 31, 31, the detent hollow parts 151 are arranged to have gaps in a circumferential direction from the flow passage holes 147, 148 described above. In the present invention, the detent hollow parts 151, 153 and the detent hollow parts 151, 153 are arranged at an angular gap of 90 degrees in the circumferential direction on the bottom surfaces 31, 31.

The valve mounting through hole 141-143 and the sensor mounting through holes 145, 146 communicate with the main hydraulic passages 9*a*, 9*b* (see FIG. 1 and the same shall apply hereinafter) into which the brake fluid flows. Further, in FIG. 3, the balls swaged in the flow passage holes 147, 148 are not shown.

Figure 4B:
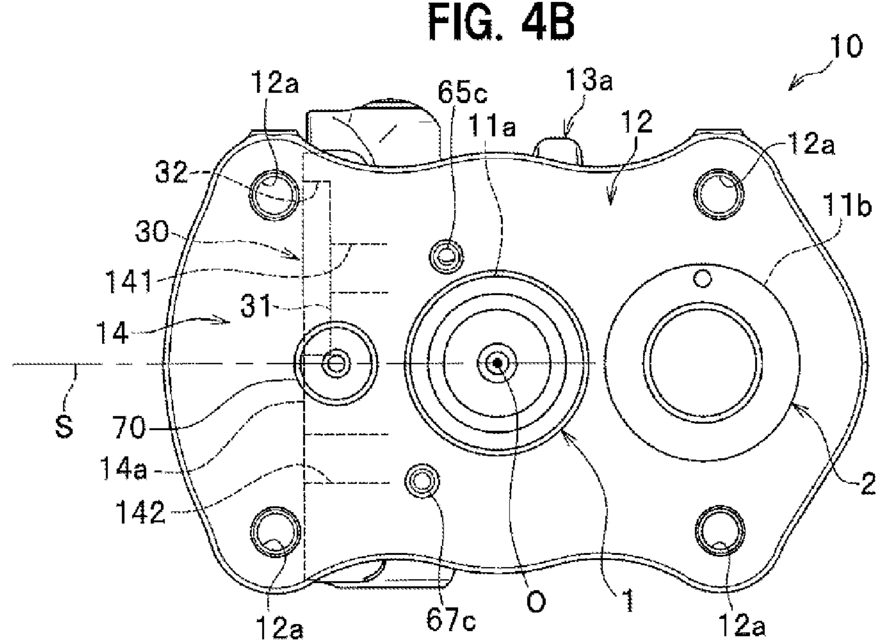

The valve mounting through holes 141, 142 are formed up and down across the center axis O of the master cylinder 1 when viewed from a right side which is a vertical direction to the mounting surface 14*a*. More specifically, as shown in FIG. 4B, the valve mounting through holes 141, 142 are arranged up and down across a reference plane S including and being vertical to the mounting surface 14*a* as shown in FIG. 4B. Accordingly, the normally open cutoff valves 4, 5, which close and open the main hydraulic passages 9*a*, 9*b*, are arranged up and down across the center axis O of the master cylinder 1.

Further, two of the sensor mounting through holes 145 and the valve-mounting through hole 143 are formed up and down across the center axis O (the reference plane S) of the master cylinder 1 similarly. In other words, the pressure sensor 7 for detecting a pressure in the main hydraulic passage 9*a* and the normally closed cut-off valve 6 for opening and closing the division hydraulic passage 9*e* (see FIG. 1) are arranged up and down across the center axis O of a master cylinder 1.

Further, the three valve mounting through holes 141-143 and the sensor mounting through hole 145 are arranged to form corners of a quadrilateral. More specifically, as shown in FIG. 4A, on the mounting surface 14*a*, line segments L1, L2,L3,L4 by connecting center positions of the three valve mounting through holes 141-143, and the sensor mounting through hole 145 form a trapezoid, and the three solenoid valves 4*a*-6*a* and the pressure sensor 7 form a quadrilateral (a trapezoid).

Further, the valve mounting through holes 141-143 are arranged so as to form the line segments L1, L2, L5 made by connecting center positions of the valve mounting through holes 141-143 form an isosceles triangle. Further, one of the two sensor mounting through holes 145, 146 is arranged on a bisector L6 at a vertical angle P1 of the isosceles triangle.

Further, the other, i.e., the sensor mounting through hole 146, is arranged in a region outside the isosceles triangle described above.

Further, the other, i.e., the sensor mounting through hole 146, is arranged inside the quadrilateral described above outside the isosceles triangle described above. Further, the other, i.e., the sensor mounting through hole 146, is arranged between the hollow parts 30, 30.

Further, the other, i.e., the sensor mounting through hole 146, is arranged on the line segment (not shown) made by connecting center positions of the flow passage holes 147, 148 of the hollow parts 30, 30.

The housing 20 is a box made of plastic and as shown in FIG. 9, includes a circumferential wall member 21 opening at a side of heads and tails thereof, a cover 22 for enclosing an opening part 21*a* on the side of heads of the circumferential wall member 21, a flange part 23 protruding from an outer circumferential edge part of an opening part 21*b* on a side of the tails of the circumferential wall member 21; two connectors 24, 25 (see FIG. 6) provided protrusively on the circumferential wall member 21; an intermediate wall 40 provided inside the circumferential wall member 21; a coil bus bar 51 and a sensor bus bar 52 (see FIG. 3, hereinafter referred to as the bus bar 51, 52) embedded in a intermediate wall 40.

Figure 8A:
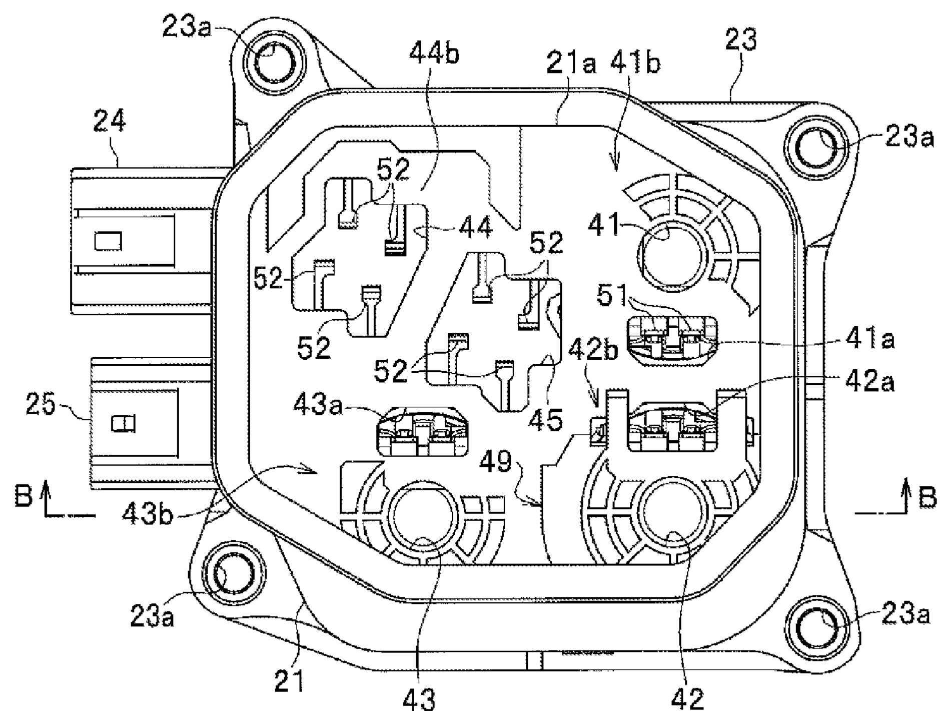
FIG. 8A is a right side view of the housing in which a lid member is removed and FIG. 8B is a cross section view taken along line B-B in FIG. 8A in which a coil is assembled with the housing.

The circumferential wall member 21 is a part covering the parts mounted on the housing 20 hermetically and an outer circumferential shape thereof is formed in a substantially quadrilateral (see FIG. 8A).

The cover 22 is, as shown in FIGS. 2A and 2B, a lid member for hermetically sealing the opening part 21*a* on the side of the heads of the circumferential wall member 21 and fixed to an end surface on the heads side by means of welding and adhesives.

The flange part 23 is a part subject to pressure joining to the housing mounting part 14. Formed at four corners of the flange part 23 are screw through holes 23*a* at corresponding locations of the mounting through holes 16 (see FIG. 3) of the housing mounting part 14. Screws 17 (see FIG. 2A) are engaged with the mounting through holes 16 of the housing mounting parts 14 to fix the housing 20 to the housing mounting part 14.

Further, as shown in FIG. 9, attached to an end surface on the side of the tails of the flange part 23 is a seal member 23*b*, having an endless form, which is hermetically contact with the housing mounting part 14 (the mounting surface 14*a*).

Figure 7:
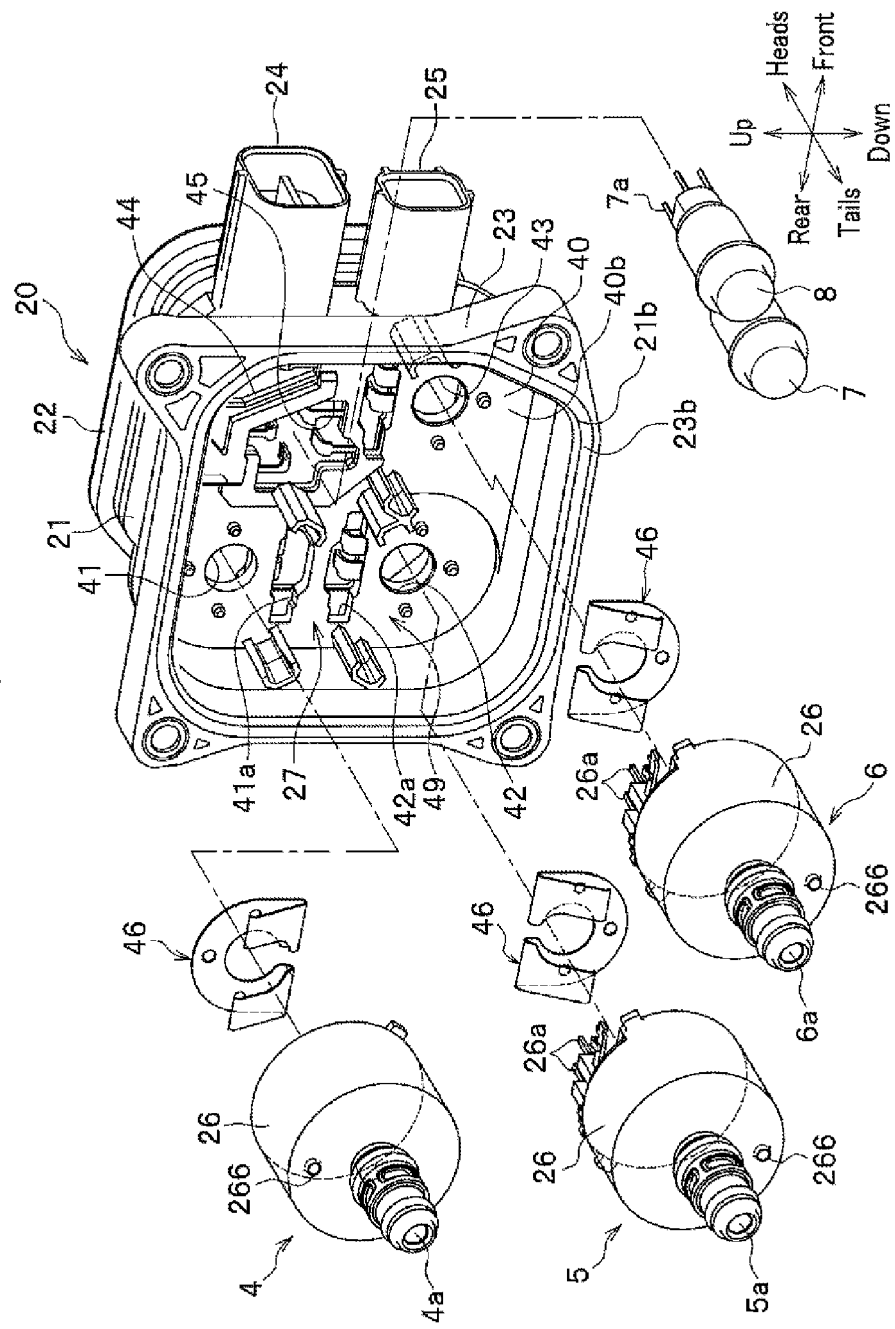
FIG. 7 is an exploded perspective view when the housing is viewed from a rear surface side (a side of a left side).

The connectors 24, 25 have, as shown in FIG. 7, a rectangular cylindrical shape and are protrusively provided on a front surface of the circumferential wall member 21 with a gap therebetween in the vertical direction. The connector 24 disposed upwardly is connected to a cable (not shown) for supplying an electric power to each of the coils 26. The connector 25 disposed downwardly is connected to cables (not shown) for sending detection signals outputted by the pressure sensors 7, 8 to the electronic control unit (not shown).

Figure 8B:
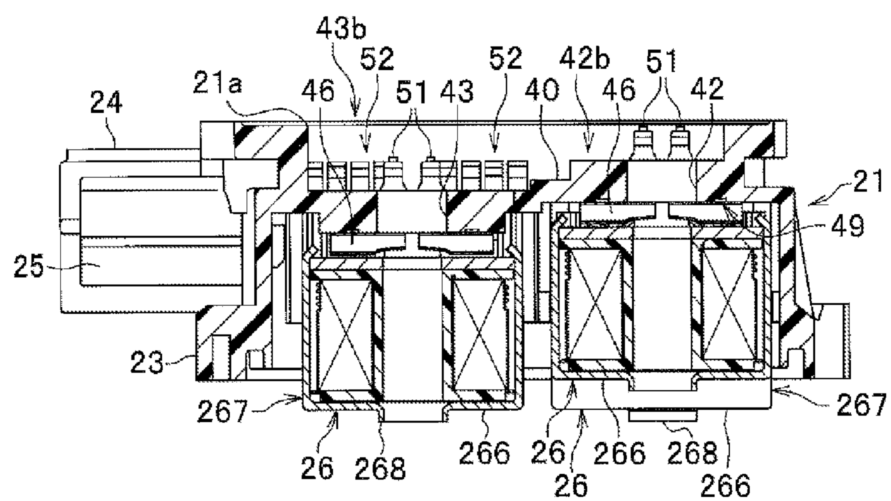

The intermediate wall 40 is, as shown in FIG. 9, a partition wall for partitioning a space in the circumferential wall member 21 into the side of heads and the side of tails. The intermediate wall 40 is, as shown in FIG. 6, formed in a substantially quadrilateral, and corners 42*b* are offset to the side of the heads relatively to the other parts. This forms a hollow part 49 (see FIG. 7) by offsetting as shown in FIG. 8B on the side of the tails of the intermediate wall 40. The hollow part 49 has a size capable of housing the coil 26. Accordingly, as described later, a mounting position of the solenoid valve 5*a* of the normally open cutoff valve 5 at the corner 42*b* can be offset toward the side of heads of the intermediate wall 40.

Formed on the side of tails of the intermediate wall 40 is a housing room 27 for housing the normally open cutoff valves 4, 5, the normally closed cut-off valve 6, and the pressure sensors 7, 8 as shown in FIG. 7. The intermediate wall 40 has, as shown in FIG. 8A, three valve insertion holes 41, 42, 43, three coil insertion openings 41*a*, 42*a*, 43*a*, and two sensor openings 44, 45 penetrate therethrough between the heads and tails.

The valve insertion hole 41 is a circular hollow cylindrical hole to which an upper end part of the solenoid valve 4*a* provided at the normally open cutoff valve 4 for the master cylinder 1 and formed at a corner part 41*b* at an upper rear side of the intermediate wall 40.

A second valve insertion hole 42 is a circular hollow cylindrical through hole into which an upper end part of the solenoid valve 5*a* of the normally open cutoff valve 5 for the master cylinder 1 is inserted and formed at the corner 42*b* at a rear lower part of the intermediate wall 40.

A third valve insertion hole 43 is a circular hollow cylindrical through hole into which an upper end part of the solenoid valve 6*a* of the normally close cutoff valve 6 for the stroke simulator 2 and formed at a corner part 43*b* on a front lower side of the intermediate wall 40.

The first coil insertion opening 41*a* is an opening through which the connecting terminal 26*a* of the coil 26 for the normally open cutoff valve 4 is inserted (see FIG. 3, the same shall apply hereinafter) and disposed on a lower side of the valve insertion hole 41. The second coil insertion opening 42*a* is an opening through which the connecting terminal 26*a* of the coil 26 for the normally open cutoff valve 5 is inserted and disposed on an upper side of the valve insertion hole 42. The third coil insertion opening 43*a* is an opening through which the connecting terminal 26*a* of the coil 26 for the normally closed cutoff valve 6 is inserted and disposed on an upper side of the valve insertion hole 43. The connecting terminals 26*a* of the coils 26 are electrically connected to the coil bus bar 51 through the coil insertion openings 41*a*, 42*a*, 43*a*, respectively.

The sensor opening 44 opens at a corner part 44*b* on a front upper side of the intermediate wall 40. Inserted into the sensor opening 44 is the terminal 7*a* for the pressure sensor 7 (see FIG. 3). The terminal 7*a* for the pressure sensor 7 is electrically connected to the sensor bus bar 52 through the sensor opening 44.

A sensor opening part 45 opens at a middle of the intermediate wall 40. Inserted into the sensor opening part 45 is a connection terminal 8*a* (see FIG. 3) for the pressure sensor 8. The connection terminal 8*a* of the pressure sensor 8 is electrically connected to the sensor bus bar 52 through the sensor opening part 45.

In the present embodiment, as shown in FIG. 7, an elastic member 46 is provided to intervene between a tails 40*b* of the intermediate wall 40 and each of the coils 26 as bias means. The elastic members 46 are, as shown in FIG. 9, a leaf spring formed in a V-shaped in a side view to absorb vibration of each of the coil 26 and restricts rotation of each of the coils 26. An elastic member in a coil shape can be used as the bias means.

Further the elastic member 46 biases each of the coil 26 toward the base 10. Accordingly, as shown in FIG. 9, the lower surface 269 of the yoke 262 for the coil 26 is inserted into the hollow part 30 provided on the mounting surface 14*a* and abuts the bottom surface 31. Further, the lower surface 269 of the yoke 262 for the coil 26 of the normally open cutoff valve 5 abuts the mounting surface 14*a*. Further, though not shown, the lower surface 269 of the yoke 262 for the coil 26 of the normally open cutoff valve 5 is inserted into the hollow part 30 of the normally closed cut-off valve 6 and abuts the bottom surface 31. When the the coil 26 abuts the base 10, heat generated at the coil 26 can be transmitted to the base 10 through the lower surface 269 of the yoke 262.

Figure 10B:
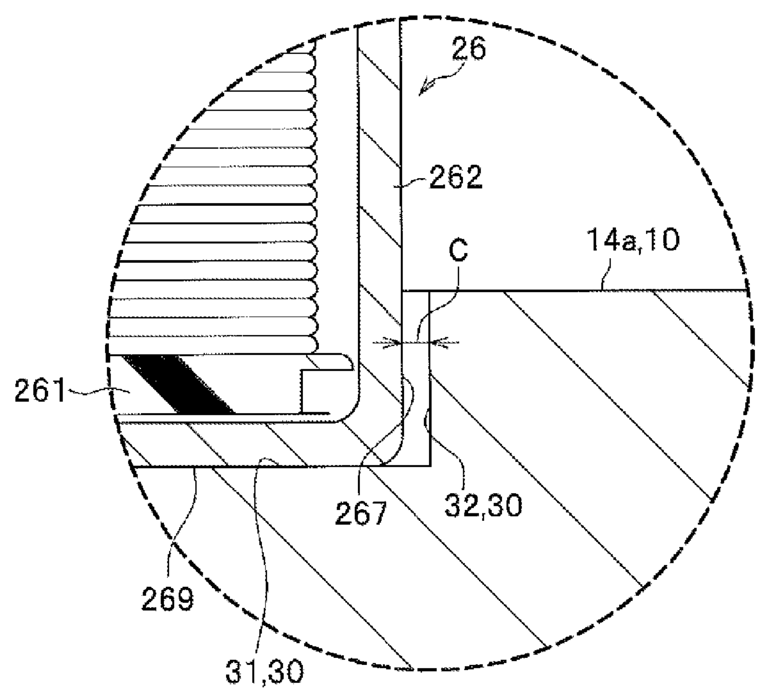

As shown in FIG. 10B, in a status in which the lower surface 269 of the yoke 262 abuts the bottom surface 31 of the hollow part 30, a clearance C is formed between a lower outer circumferential surface 267 and the circumferential surface 32 of the hollow part 30. More specifically, the lower outer circumferential surface 267 of the yoke 262 does not contact the circumferential surface 32 of the hollow part 30.

Next, the flow passages provided in the master cylinder apparatus A1 will be described more specifically. In the descriptions, it is assumed that a side where a tube connection part 15 is provided is a front in the front-rear direction of the master cylinder apparatus A1 (the base 10); a side provided with a vehicle body fixing part 12 is a rear surface; a side to which a reservoir 3 is attached is a top surface, a side opposite to this is an under surface; a side to which the reservoir 3 is provided is a left side surface; and a side on which the mounting surface 14*a* is formed is a right side surface.

Figure 12:
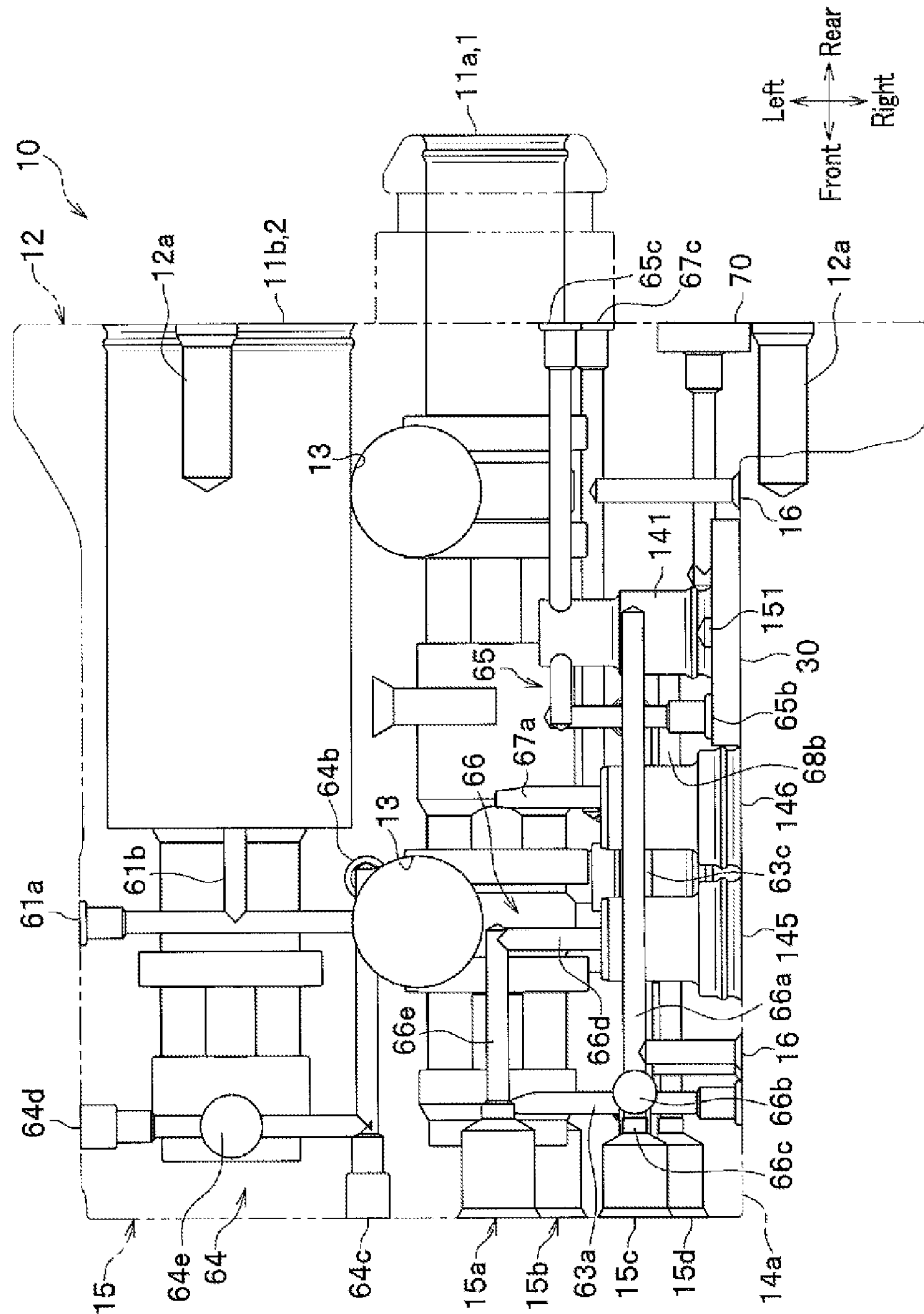
FIG. 12 is a perspective view of the fluid passage structure part of the master cylinder apparatus which is viewed from a top side thereof.
Figure 15A:
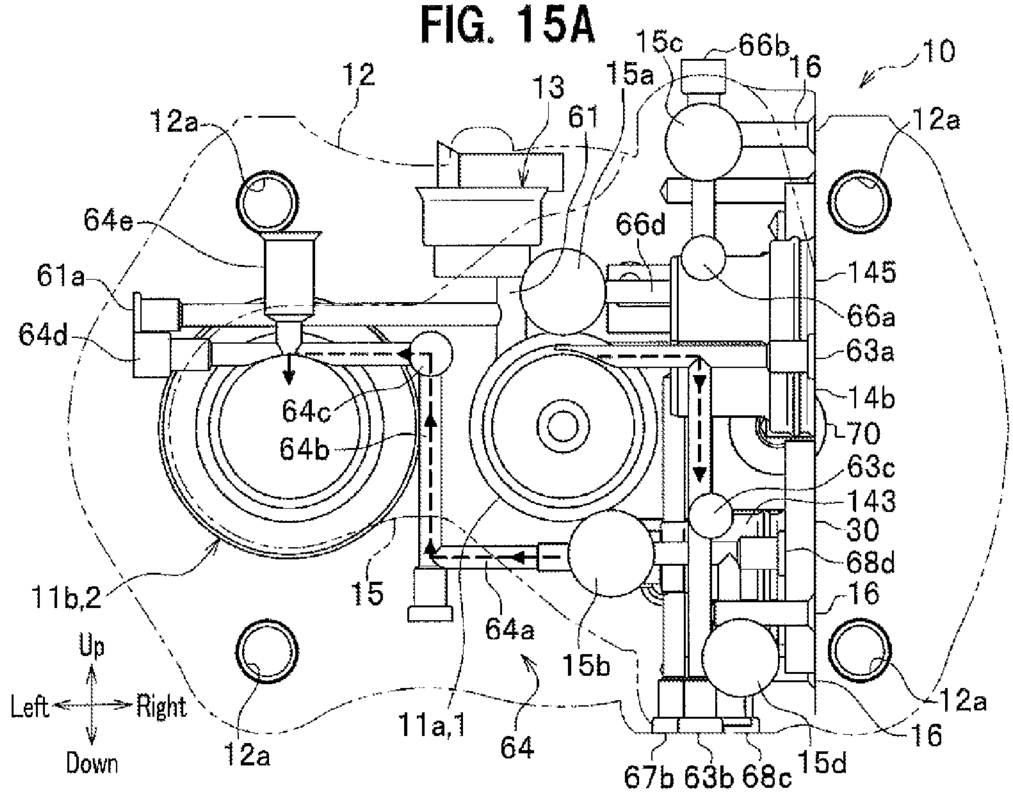
FIG. 15A is a perspective view of the fluid passage structure part of the master cylinder apparatus which is viewed from a front side thereof.
Figure 16:
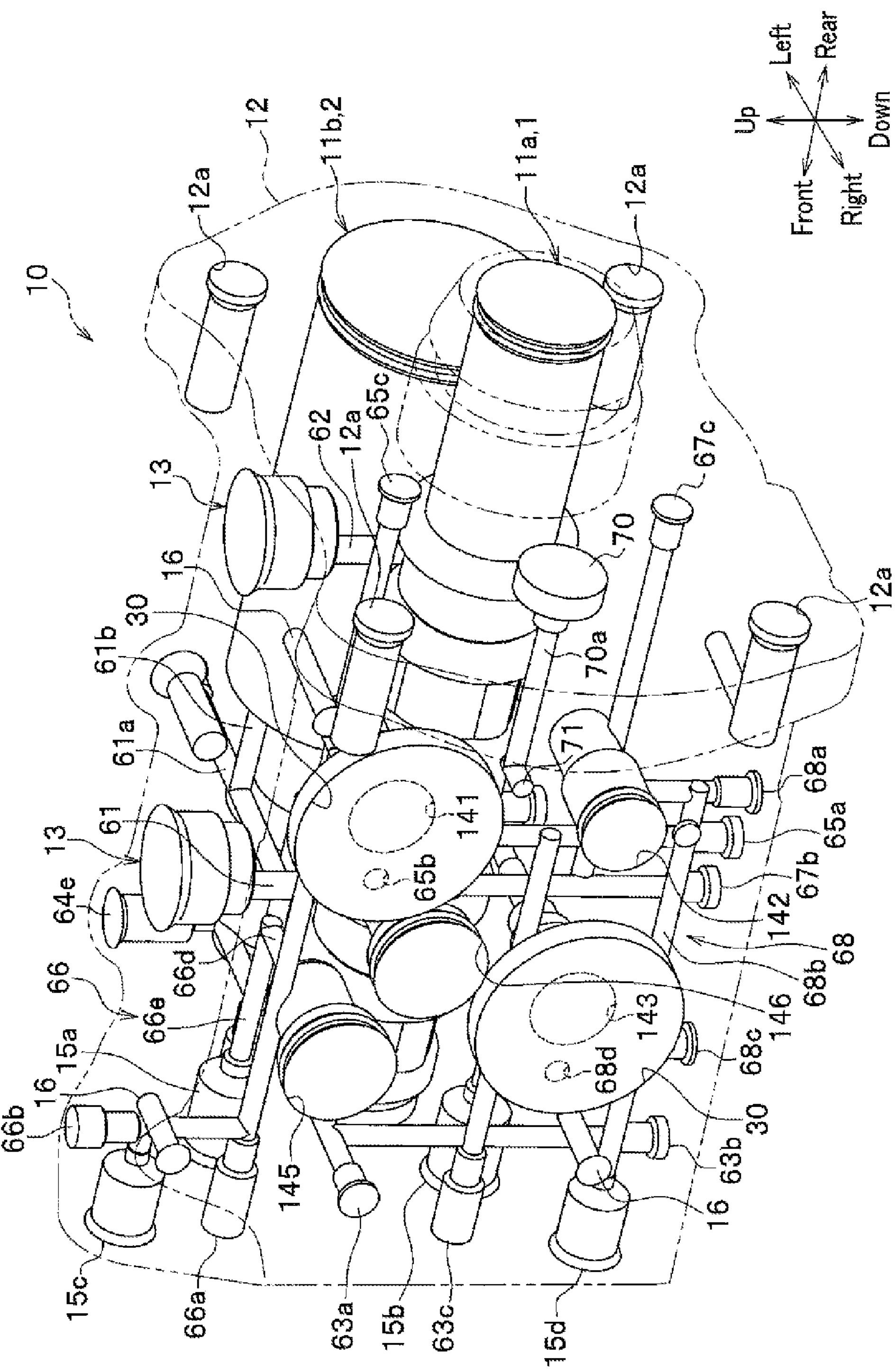
FIG. 16 is a perspective view of the fluid passage structure part of the master cylinder apparatus of which insides of respective mounting holes and flow passages are visualized when viewed from a slant rear part of the right side surface.

As shown in FIG. 16, reservoir mounting parts 13, 13 are circular cylindrical holes with bottoms as shown in FIG. 16. As shown in FIG. 12, the reservoir mounting parts 13, 13 are arranged with gaps in the front-rear direction (axial direction of the master cylinder 1). As shown in FIG. 15A, the reservoir mounting part 13 on a side near the front surface communicates with a first cylinder hole 11*a* of the master cylinder 1 (a side of a first piston 1*a*, hereinafter referred to a primary side) through a first flow passage 61). Further, the reservoir mounting part 13 on the side near the rear surface communicates with the first cylinder hole 11*a* of the master cylinder 1 through a second flow passage 62 (a side of a second piston 1*b*, hereinafter referred to as a secondary side) through the second flow passage 62. The first flow passage 61 and the second flow passage 62 include vertical holes provided by drilling from the bottoms of the reservoir mounting parts 13, 13 toward the first cylinder hole 11*a* of the master cylinder 1, respectively.

Figure 18:
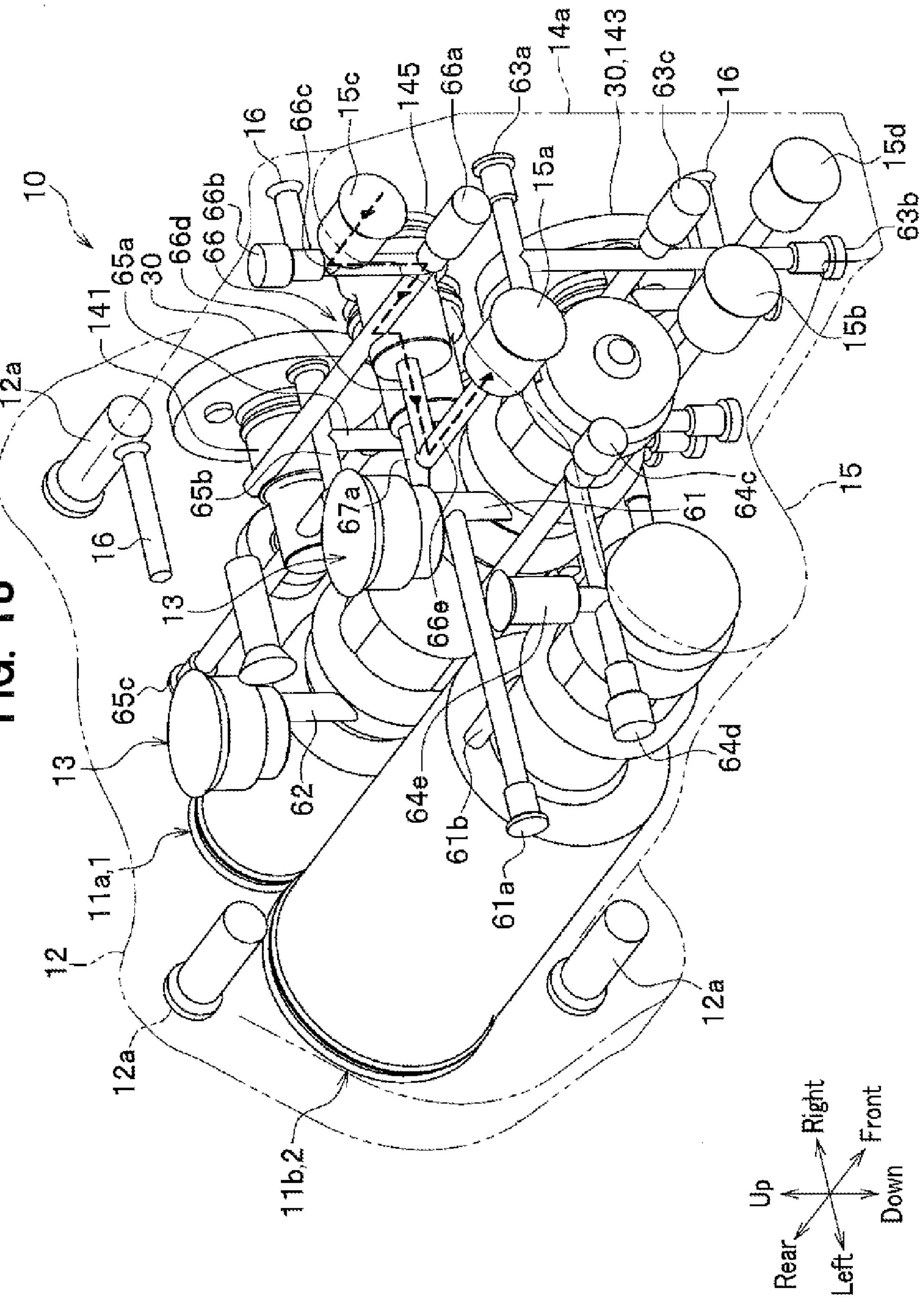
FIG. 18 is a perspective view of the fluid passage structure part of the master cylinder apparatus of which insides of the respective mounting holes and flow passages are visualized when viewed from a left slant upper part of the front side surface.

The first flow passage 61 communicates with a lateral hole 61*a* as shown in FIG. 18 and the lateral hole 61*a* at a halfway part thereof communicates with the lateral hole 61*b* which is orthogonally arranged to the lateral hole 61*a*. The lateral hole 61*a* is arranged above the front part (front surface part) of a second cylinder hole 11*b*. The lateral hole 61*a* is provided by drilling from the left side surface of the base 10 over the front part of the second cylinder hole 11*b* to the right surface and communicates with the first flow passage 61 at the right end thereof. A lateral hole 61*b* is provided by drilling from an inner surface of a step part 11*b*1 to a front surface and communicates with the lateral hole 61*a* at a front end thereof.

Figure 17:
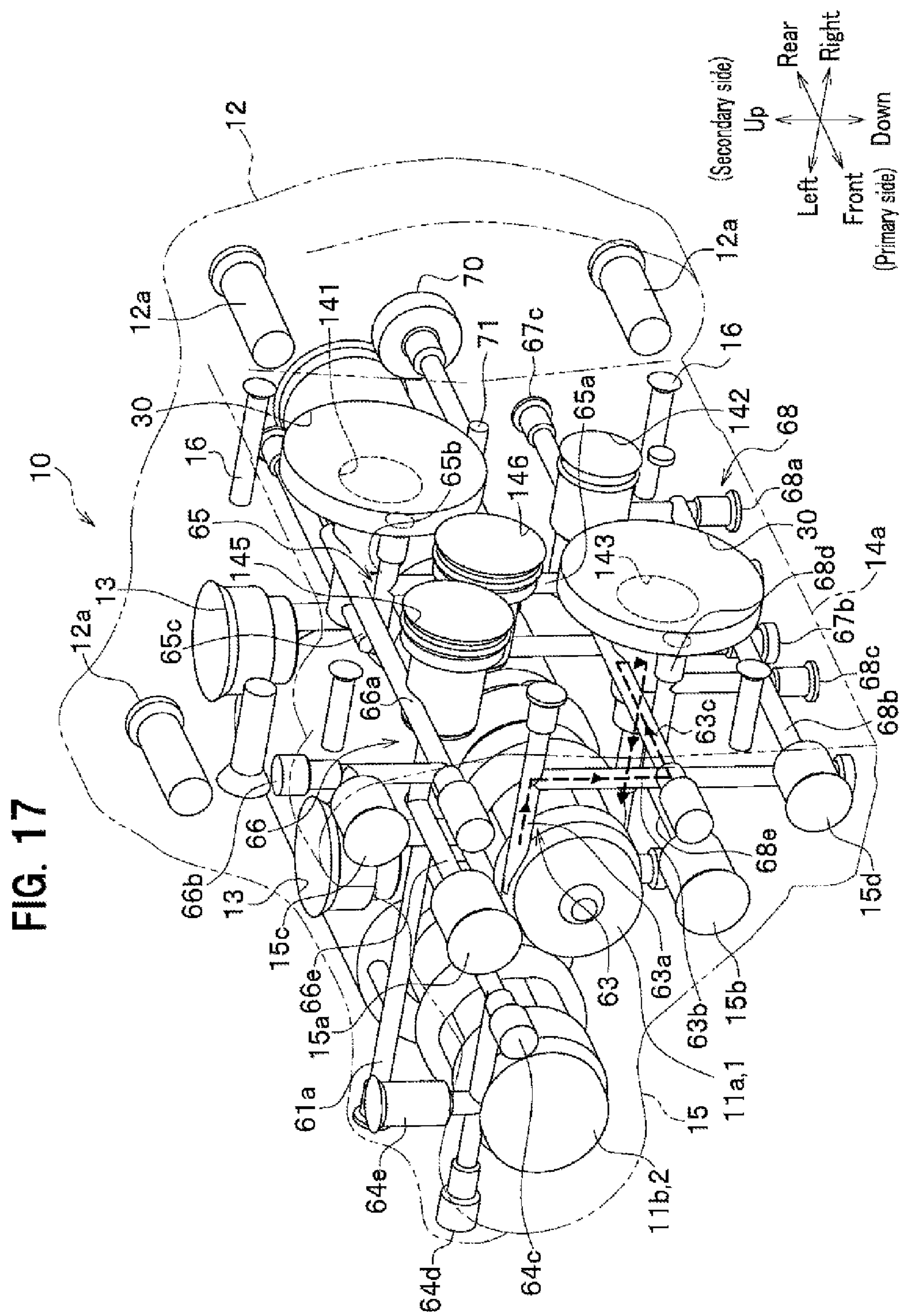
FIG. 17 is a perspective view of the fluid passage structure part of the master cylinder apparatus of which insides of the respective mounting holes and flow passages are visualized when viewed from a front slant upper part of the right side surface.

The primary side of the first cylinder hole 11*a* is, as shown in FIG. 17, communicates with the valve mounting through hole 143 through a third flow passage 63. The third flow passage 63 includes a cylinder-side lateral hole 63*a*, a vertical hole 63*b*, and a valve-side lateral hole 63*c*. The cylinder-side lateral hole 63*a* is provided by drilling from the right side surface to the left side surface of the base 10 and communicates with the primary side of the first cylinder hole 11*a* at a left end thereof. The vertical hole 63*b* is provided by drilling from the bottom surface to the top surface of the base 10 and communicates with the cylinder-side lateral hole 63*a*. The valve-side lateral hole 63*c* is provided by drilling from the front surface to the rear surface of the base 10, crosses the vertical hole 63*b* and penetrates a circumferential wall of the valve mounting through hole 143, and reaches the vicinity of the valve mounting through hole 142 at a rear end thereof.

Figure 13:
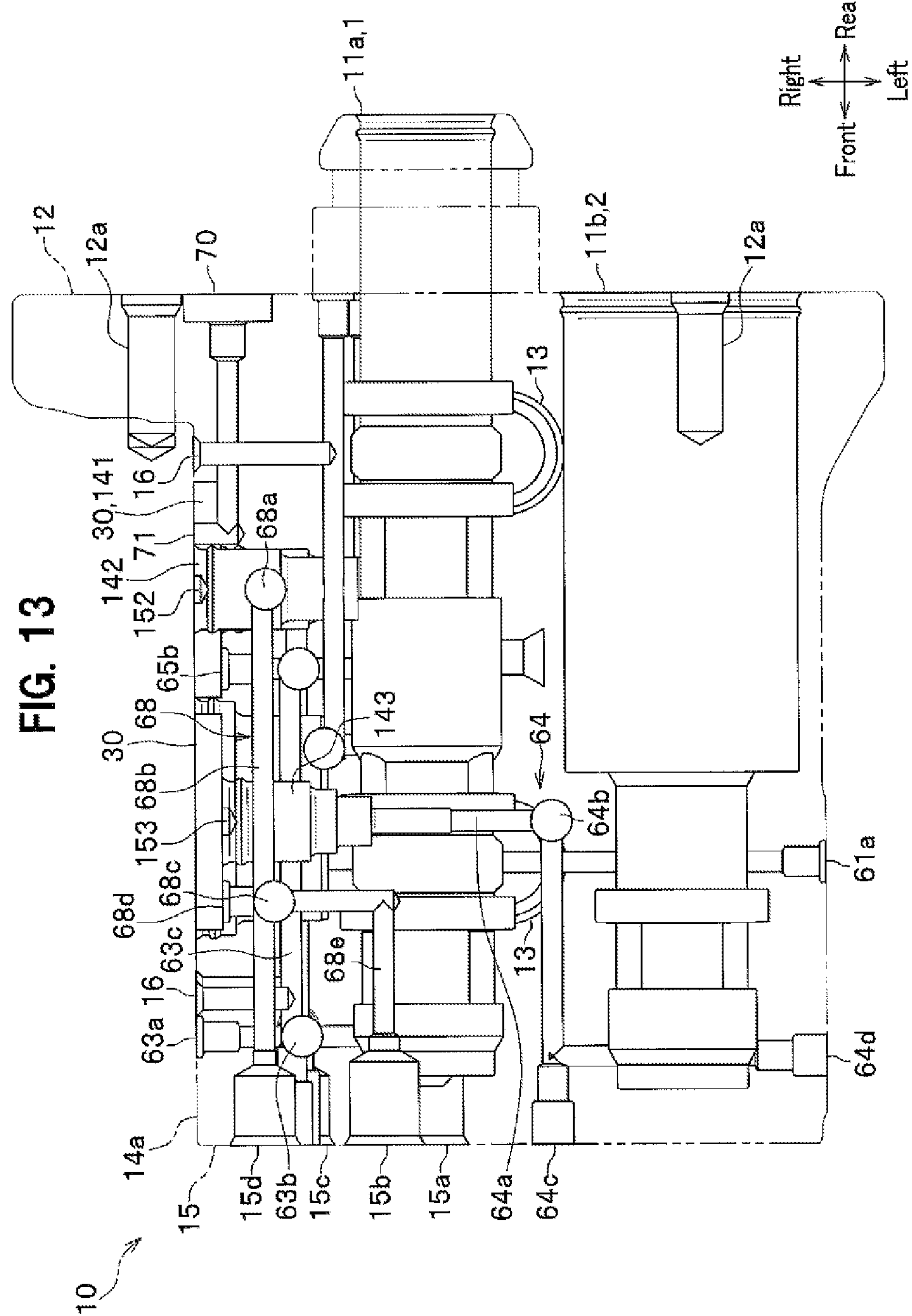
FIG. 13 is a perspective view of the fluid passage structure part of the master cylinder apparatus which is viewed from a bottom side thereof.
Figure 19:
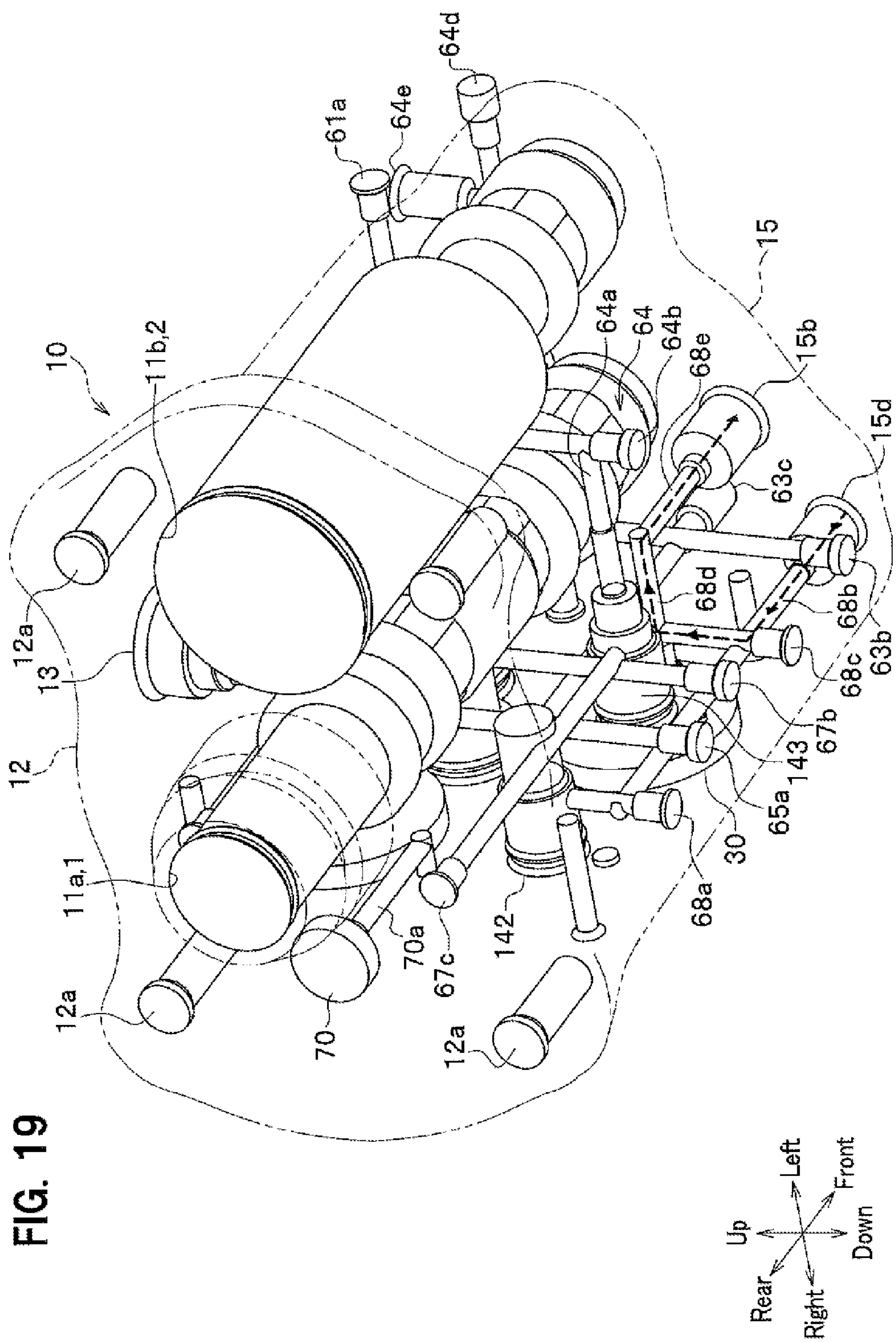
FIG. 19 is a perspective view of the fluid passage structure part of the master cylinder apparatus of which insides of the respective mounting holes and flow passages are visualized when viewed from a left slant lower part of the rear side surface.

The valve mounting through hole 143 is a circular cylindrical hollow hole with a step and a bottom and communicates with the second cylinder hole 11*b* of the stroke simulator 2 through a fourth flow passage 64 as shown in FIGS. 13, 15A, and 19. The fourth flow passage 64 includes a valve-side lateral hole 64*a*, a vertical hole 64*b*, a cylinder-side first lateral hole 64*c*, and a cylinder-side second lateral hole 64*d*. The fourth flow passage 64 is provided by drilling from a bottom surface of the valve mounting through hole 143 to the left side surface of the base 10. The valve-side lateral hole 64*a* passes under the front part of the first cylinder hole 11*a* and reaches a region between the first cylinder hole 11*a* and the second cylinder hole 11*b*. The vertical hole 64*b* is provided by drilling from the bottom surface to the top surface of the base 10 and crosses a left end of the valve-side lateral hole 64*a*.

The cylinder-side first lateral hole 64*c* is provided by drilling from the front surface to the rear surface of the base 10 and communicates with an upper end of the vertical hole 64*b* as shown in FIG. 12. The cylinder-side second lateral hole 64*d* is provided by drilling from the left surface to the right side surface of the base 10, penetrates a circumferential wall at an upper front side of the second cylinder hole 11*b*, and a right end thereof communicates with a halfway part of the cylinder-side first lateral hole 64*c*. Further, provided at the cylinder-side second lateral hole 64*d* is a fluid introducing port 64*e*.

Figure 11:
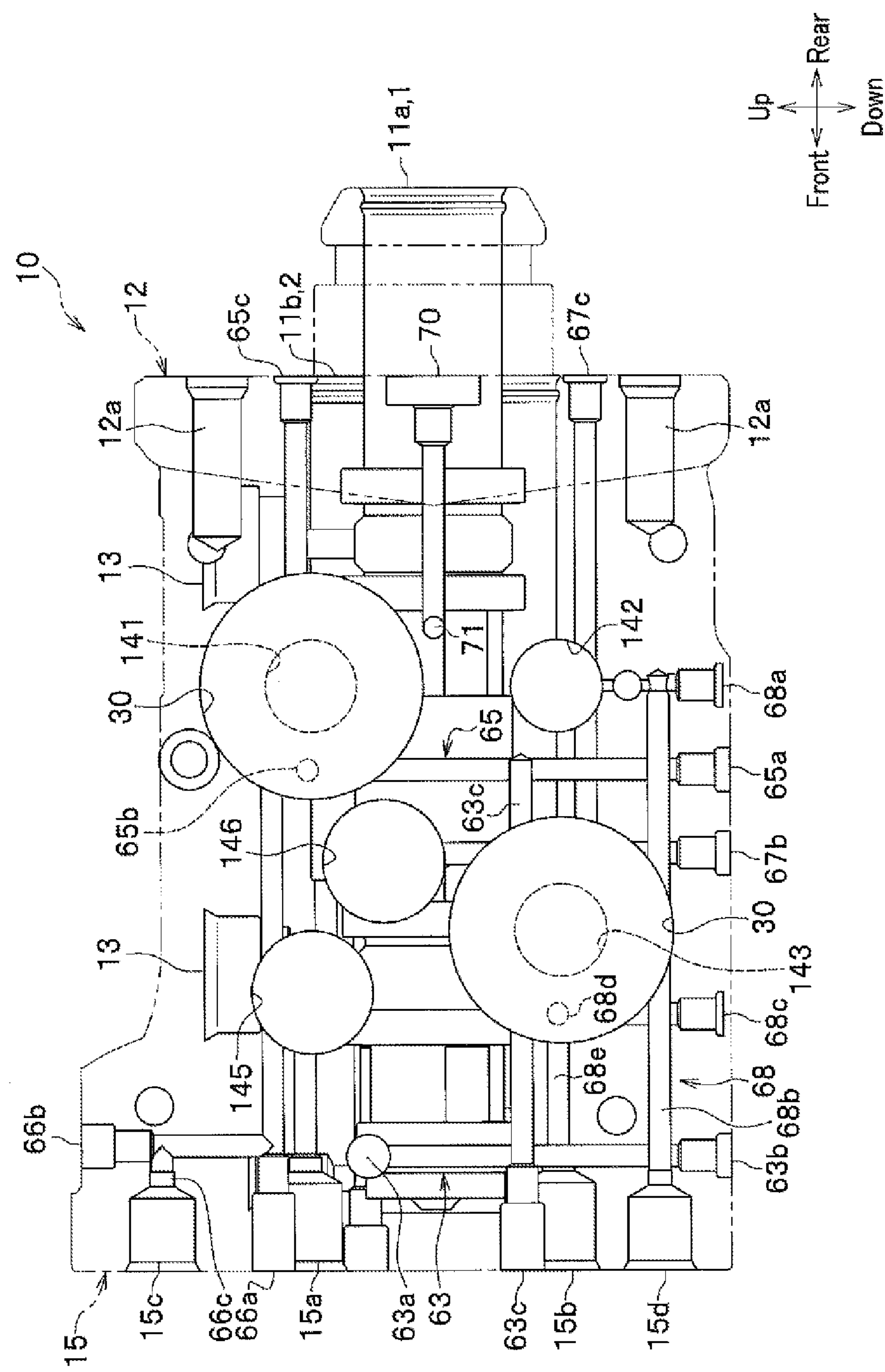
FIG. 11 is a perspective view of a fluid passage structure part of the master cylinder apparatus which is viewed from a right side thereof.

The valve-side lateral hole 63*c* described above communicates with the valve mounting through hole 141 through a fifth flow passage 65 as shown in FIGS. 11 and 17. The fifth flow passage 65 includes a vertical hole 65*a*, a first lateral hole 65*b* (see FIG. 17), and a second lateral hole 65*c* (see FIG. 17). The vertical hole 65*a* is provided by drilling from the bottom surface to the top surface of the base 10 at a region between the valve mounting through hole 141 and the valve mounting through hole 143, and a halfway part crosses a rear end of the valve-side lateral hole 63*c* of the third flow passage 63. The first lateral hole 65*b* is arranged at a front part of the valve mounting through hole 141, provided by drilling from the bottom surface 31 (see FIG. 3, the same shall apply hereinafter) to the left side surface of the base 10, and as shown in FIG. 17, a halfway part thereof crosses an upper end of the vertical hole 65*a*. The second lateral hole 65*c* is arranged above the first cylinder hole 11*a* (see FIG. 15B), provided by drilling from the rear surface to the front surface of the base 10, and penetrates a bottom side wall of the valve mounting through hole 141 formed in a circular hollow cylindrical shape with a bottom and a step part in the front-rear direction, and reaches a rear end of the first lateral hole 65*b*.

The valve mounting through hole 141 communicates with the sensor mounting through hole 145, the output port 15*a*, and the input port 15*c* through a sixth flow passage 66 as shown in FIGS. 12 and 17. The sixth flow passage 66 includes a first lateral hole 66*a*, a vertical hole 66*b*, a second lateral hole 66*c*, a third lateral hole 66*d*, and a fourth lateral hole 66*e*. The first lateral hole 66*a* is provided by drilling from the front surface to the rear surface of the base 10, penetrates un upper circumferential wall of the sensor mounting through hole 145, and reaches an upper circumferential wall of the valve mounting through hole 141. A crossing point of the first lateral hole 66*a* and the valve mounting through hole 141 is closer to the side of the mounting surface 14*a* than the crossing point of the second lateral hole 65*c* of the fifth flow passage 65 and the valve mounting through hole 141. The vertical hole 66*b* is provided by drilling from the top surface to the bottom surface of the base 10 and communicates with the first lateral hole 66*a* at the lower end thereof. The second lateral hole 66*c* is provided by drilling from the bottom surface of the input port 15*c* having a bottom to the rear surface of the base 10, and communicates with the vertical hole 66*b* at the rear end thereof.

The third lateral hole 66*d* is provided by drilling from the bottom of the sensor mounting through hole 145 to the left side surface of the base 10 as shown in FIG. 12. The fourth lateral hole 66*e* is provided by drilling from the bottom surface of the output port 15*a* having a circular hollow cylindrical shape with a bottom to the rear surface of the base 10 and communicates with a left end of the third lateral hole 66*d*.

More specifically, the output port 15*a* and the input port 15*c* communicate with each other through the sixth flow passage 66. The input port 15*c* locates obliquely upward at right side of the output port 15*a*.

Figure 15B:
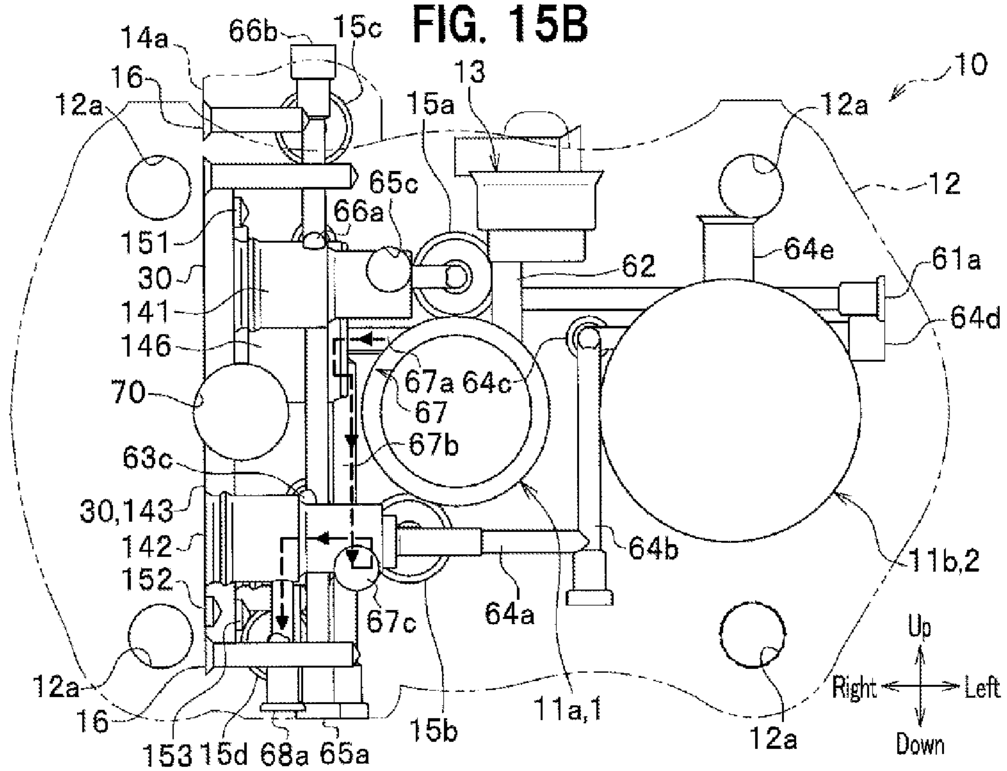
FIG. 15B is a perspective view of the fluid passage structure part of the master cylinder apparatus which is viewed from the front side thereof.

The secondary side of the first cylinder hole 11*a* communicates with a sensor mounting hole 146 and the valve mounting through hole 142 through a seventh flow passage 67 as shown in FIG. 15B. The seventh flow passage 67 includes a sensor lateral hole 67*a*, a vertical hole 67*b*, and a lateral hole 67*c*. The sensor lateral hole 67*a* is provided by drilling from the bottom of the sensor mounting hole 146 to the left surface of the base 10, and a rear end thereof communicates with the secondary side of the first cylinder hole 11*a*. The vertical hole 67*b* is provided by drilling from the bottom to the top surface of the base 10 on the right side of the first cylinder hole 11*a* (on a side of the mounting surface 14*a*), and the upper end thereof communicates with the bottom of the sensor mounting hole 146. The lateral hole 67*c* is provided by drilling from the rear surface to the front surface of the base 10 and penetrates the bottom side wall of the sensor mounting hole 146 in front-rear direction, and the front end thereof crosses the vertical hole 67*b*, as shown in FIG. 16.

Figure 14:
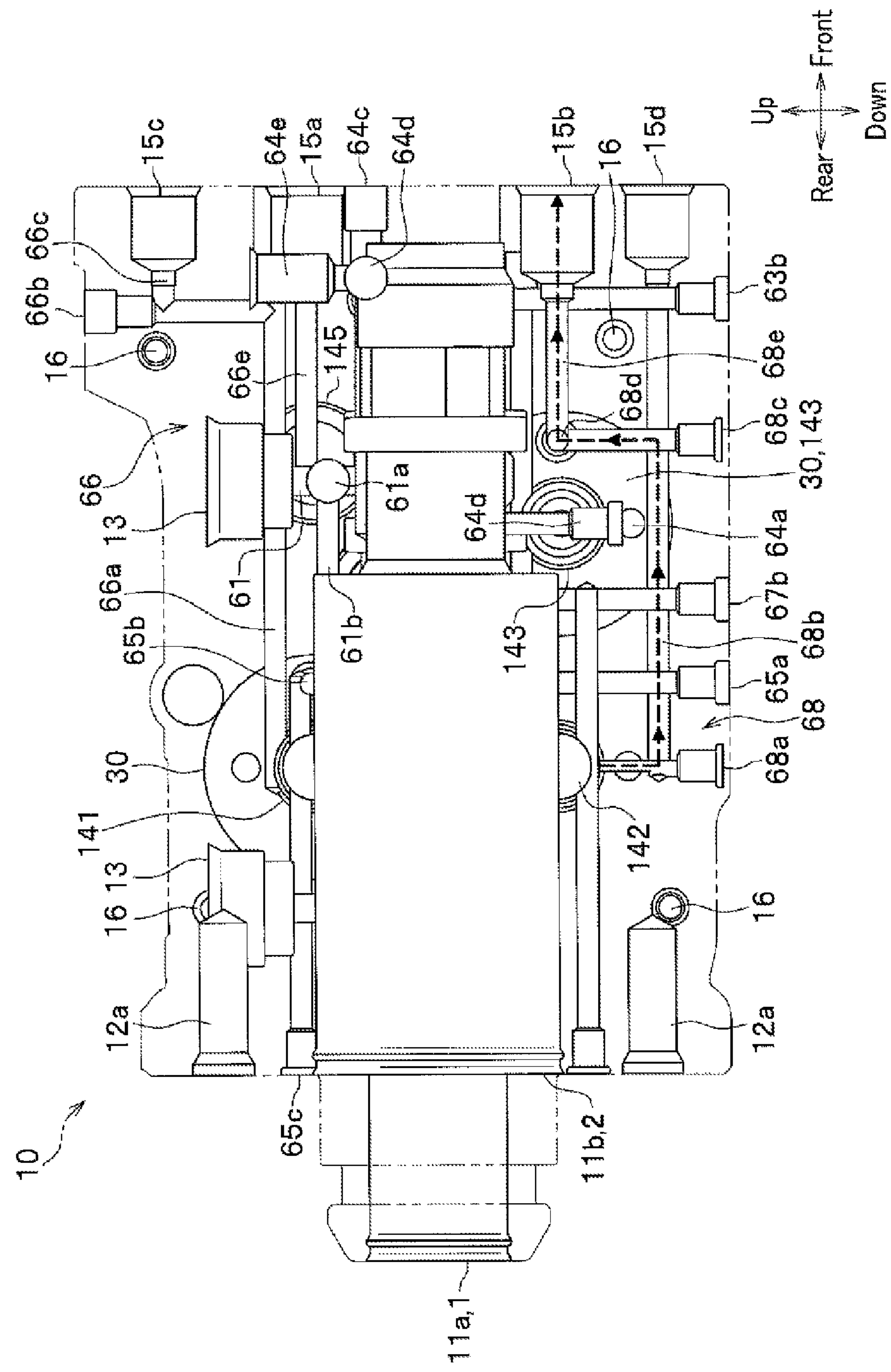
FIG. 14 is a perspective view of the fluid passage structure part of the master cylinder apparatus which is viewed from a left side thereof.
Figure 20:
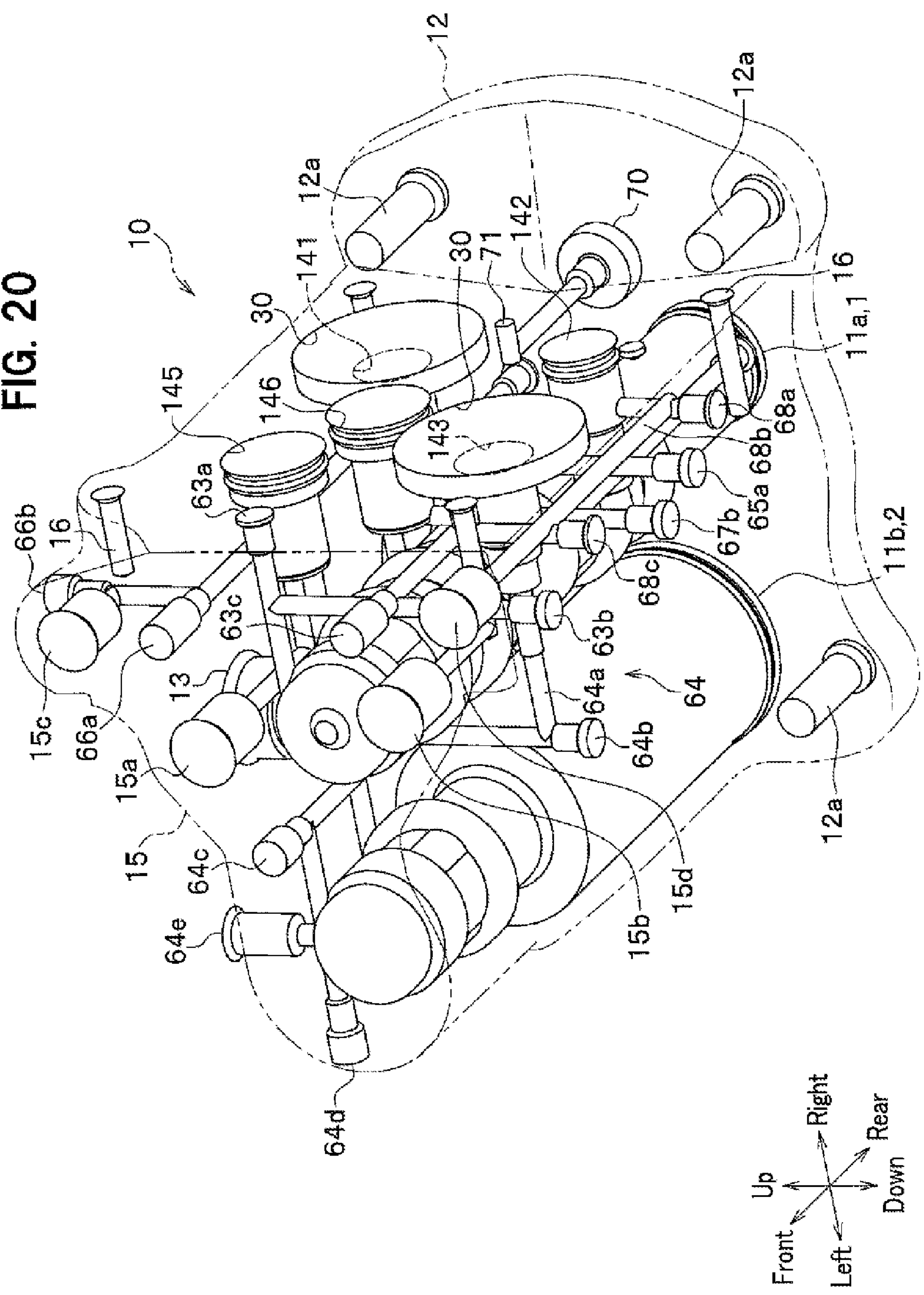
FIG. 20 is a perspective view of the fluid passage structure part of the master cylinder apparatus of which insides of the respective mounting holes and flow passages are visualized when viewed from a right slant lower part of the front side surface.

The valve mounting through hole 142 is a hole having a circular hollow cylindrical shape with a bottom and a step communicates with the input port 15*b* and the input port 15*d* through an eighth flow passage 68 as shown in FIG. 17. The eighth flow passage 68 includes a valve-side vertical hole 68*a*, the lower lateral hole 68*b*, a port-side vertical hole 68*c*, a first upper lateral hole 68*d*, and a second upper lateral hole 68*e*. The valve-side vertical hole 68*a* is provided by drilling from the bottom surface to the top face of the base 10 and communicates with the lower part of the circumferential wall of the valve mounting through hole 142 as shown in FIGS. 14 and 20. The lower lateral hole 68*b* is provided by drilling from the bottom surface to the rear surface of an input port 15*d* having a bottom and circular hollow cylindrical shape and passes under the valve mounting through hole 143, and the rear end thereof communicates with the valve-side vertical hole 68*a*. The port-side vertical hole 68*c* is provided by drilling from the bottom surface to the upper surface of the base 10 in front of the valve mounting through hole 143 and crosses the lower lateral hole 68*b* at the halfway part thereof. The first upper lateral hole 68*d* is provided by drilling from the bottom surface 31 of the hollow part 30 to a left side surface of the base 10 in front of the valve mounting through hole 143. The second upper lateral hole 68*e* is provided by drilling from the bottom surface of the output port 15*b* with the bottom and the circular hollow cylindrical shape to the rear face of the base 10, and the rear end thereof communicates with the left end of the first upper lateral hole 68*d*.

More specifically, the output port 15*b* and the input port 15*d* communicate with each other through the eighth flow passage 68. Further, the input port 15*d* locates at slant lower part on right side of the output port 15*b*.

Further, as shown in FIG. 16, at the vehicle body fixing part 12 of the base 10 a ventilation hole 70 is formed to open. The ventilation hole 70 has a circular hollow cylindrical shape with a bottom and a communication hole 70*a* provided by drilling from the bottom surface to the front surface of the base 10. A front end of the communication hole 70*a* communicates with a hole 71 formed by drilling to extend from the right side surface to the left side surface of the base 10 (the mounting surface 14*a*). The ventilation hole 70 is closed with a waterproof ventilation member (not shown) which permeates water therethrough and allows the air to permeate therethrough. The waterproof ventilation member may be formed with, for example, Gore-Tex (registered trademark), etc. Accordingly, the outside of the base 10 communicates with the inside of the housing 20 hermetically fixed to the mounting surface 14*a* through the ventilation hole 70.

The main hydraulic passage 9*a* includes a flow passage extending from the third flow passage 63 to the output port 15*a*, via the fifth flow passage 65, the valve mounting through hole 141, the first lateral hole 66*a* of the sixth flow passage 66, the sensor mounting through hole 145, the third lateral hole 66*d*, and the fourth lateral hole 66*e*.

The main hydraulic passage 9*b* includes a flow passage extending from the seventh flow passage 67 (the sensor mounting hole 146) to the output port 15*b*, via the valve mounting through hole 142, and the eighth flow passage 68.

A connection hydraulic passage 9*c* includes the sixth flow passage 66 (the second lateral hole 66*c*, the vertical hole 66*b*, and the first lateral hole 66*a*) connected to the input port 15*c*.

A connection hydraulic passage 9*d* includes the eighth flow passage 68 (lower lateral hole 68*b*) connected to the input port 15*d*.

The division hydraulic passage 9*e* includes a hydraulic passage extending from the valve mounting through hole 143 to the second cylinder hole 11*b* of the stroke simulator 2 via the fourth flow passage 64.

Next, a flow of the brake fluid in the master cylinder apparatus A1 (the base 10) will be described. In a status in which the master cylinder apparatus A1 (see FIG. 1) normally functions, i.e., in a status in which the normally open cutoff valves 4 and 5 close and the normally closed cut-off valve 6 opens, when the brake pedal P (see FIG. 1) is operated, the brake fluid pressure generated by the master cylinder 1 flows from the third flow passage 63 to the fourth flow passage 64 through the valve-mounting through hole 143 as shown by arrows in FIG. 17, and then, flows into the second cylinder hole 11*b* of the stroke simulator 2 through the fourth flow passage 64 as shown in arrows in FIG. 15A. Further, variation in a volume resulting from operation of the stroke simulator 2 ejects the brake fluid through the second cylinder hole 11*b*. The ejected brake fluid flows into the first flow passage 61 through the lateral hole 61*b* and the lateral hole 61*a* and returns to the master cylinder 1 (the reservoir 3) (see FIG. 18).

This allows the brake pressure generated by the master cylinder 1 not to be transmitted to wheel cylinders, but to the stroke simulator 2, which displaces a piston 2*a*, so that a stroke of the brake pedal P is allowed and a spurious reaction operation force is applied to the brake pedal P.

Further, when the depression of the brake pedal P is detected by a stroke sensor (not shown), etc., an electric motor of the motor cylinder device A2 is driven, which displaces the slave piston, so that the brake fluid in the cylinder is pressurized.

The pressurized brake fluid is inputted into the input port 15*c* through a tube member Hc (see FIG. 1) and as shown by arrows in FIG. 18, flows into the 15*a* through the input port 15*c* and the sixth flow passage 66 (the sensor mounting through hole 145).

Further, the pressurized brake fluid flows from the output port 15*a* into the wheel cylinders W, W through the hydraulic pressure control device A3. This applies brake forces to the wheels through operations of the wheel cylinders W, respectively.

The brake fluid pressurized by the motor cylinder device A2 is inputted into the input port 15*d* through a tube member Hd (see FIG. 1) and as shown by arrows in FIG. 19, flows from the input port 15*d* to the output port 15*b* through the eighth flow passage 68.

On the other hand, in a status in which the motor cylinder device A2 does not operate (for example, in a case where an electric power is not available and in a case of emergency), both the normally open cutoff valves 4, 5 are in closing sates and the normally closed cut-off valve 6 is in a open status. Accordingly, the brake fluid pressure generated by the master cylinder 1 is directly transmitted to the wheel cylinder W, W through the main hydraulic passage 9*a*, 9*b*.

More specifically, on the primary side of the master cylinder 1, the brake fluid pressure generated by the master cylinder 1 is transmitted to the sixth flow passage 66 (the sensor mounting through hole 145) via the third flow passage 63, the fifth flow passage 65, and the valve mounting through hole 141 and is outputted through the output port 15*a*.

Further, on the secondary side of the master cylinder 1, the brake fluid pressure generated by the master cylinder 1 is transmitted, as shown by arrows in FIG. 15B, to the valve mounting through hole 142 from the seventh flow passage 67 forming the main hydraulic passage 9*b* (the sensor mounting hole 146) and then, outputted, as shown by arrows in FIG. 14 by the output port 15*b* through the eighth flow passage 68.

According to the embodiment described above, the master cylinder 1 and the two normally open cutoff valves 4, 5 for opening and closing the flow passages are arranged on the one surface of the base 10, when viewed from a direction vertical to the one surface of the base 10, opposite to each other across the center axis O of the master cylinder 1, which can shorten the flow passages connecting the master cylinder 1 to the normally open cutoff valves 4, 5. This simplifies the structure of the flow passages to down-size the base 10 (the master cylinder apparatus A1).

Further, the normally open cutoff valves 4, 5 for opening and closing the two main hydraulic passages 9*a*, 9*b* connected to the master cylinder 1 are arranged opposite each other across the center axis O of the master cylinder 1. Accordingly, though the master cylinder 1 is of the tandem type, the two main hydraulic passages 9*a*, 9*b* connected to the master cylinder 1 can be shorten, so that the base 10 (the master cylinder apparatus A1) can be down-sized by simplifying the structure of the flow passages.

Further, because the hollow parts 30, 30 are provided at the valve-mounting through holes 141, 141, mounting positions of the normally open cutoff valve 4 and the normally closed cut-off valve 6 can be changed by depths of the hollow parts 30, 30. This enhances a degree of freedom in forming the flow passages because the flow passages connected to the normally open cutoff valves 4 and the normally closed cut-off valve 6 can be changed. This results in simplification of the structure of the flow passages, so that the base 10 (the master cylinder apparatus A1) can be down-sized.

The hollow parts 30, 30 are formed for the normally open cutoff valve 4 and the normally closed cut-off valve 6 which are provided in the same system of the flow passages, but not formed for flow passages of other system. This can make the flow passage formation position different for each of the system, so that a degree of freedom in forming the flow passage. This can simplify the structure of the flow passages, so that the down-sizing the base 10 (the master cylinder apparatus A1) can be provided. Further, it is also possible that the hollow part 30 is provided only for the normally open cutoff valve 5 in the flow passage of the other system (the main hydraulic passage 9*b*), so that the flow passage formation positions can be differentiated from the system of the main hydraulic passage 9*a*.

Figure 21A:
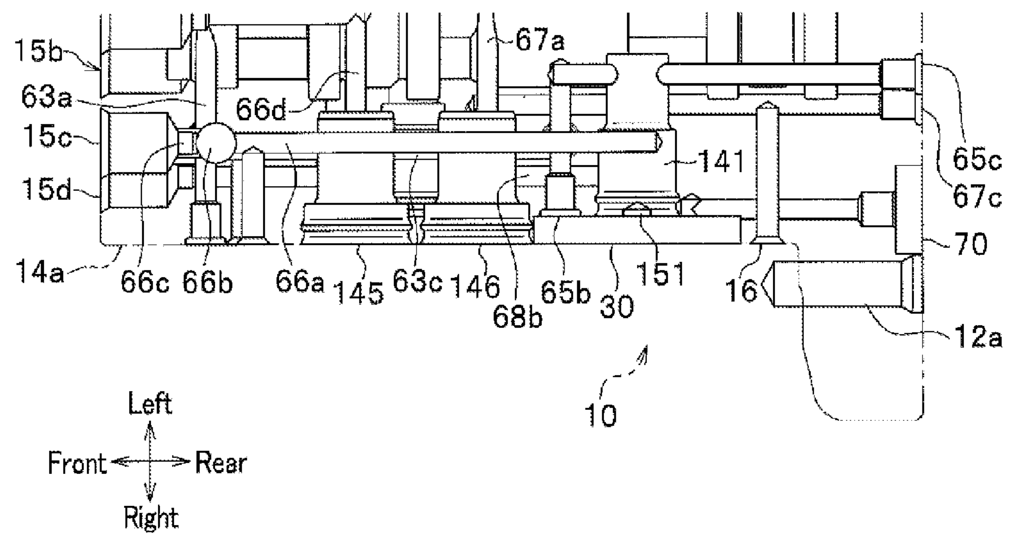
FIGS. 21A and 21B are illustrations showing an operation by hollow parts.

For example, in the present embodiment, as shown in FIG. 21A, the valve mounting through hole 141 is offset on an inner side of the base 10 by the hollow part 30 as shown in FIG. 21A. Accordingly, formation positions of the flow passages for the valve mounting through hole 141 and the sensor mounting through hole 145 agrees in the front-rear direction of the base 10. These can be connected with one of the first lateral hole 66*a*. Further, the flow passage formation positions of the valve mounting through hole 141 and the sensor mounting through hole 145 are automatically restricted by the structures of the pressure sensor 7 and the normally open cutoff valve 4.

Figure 21B:
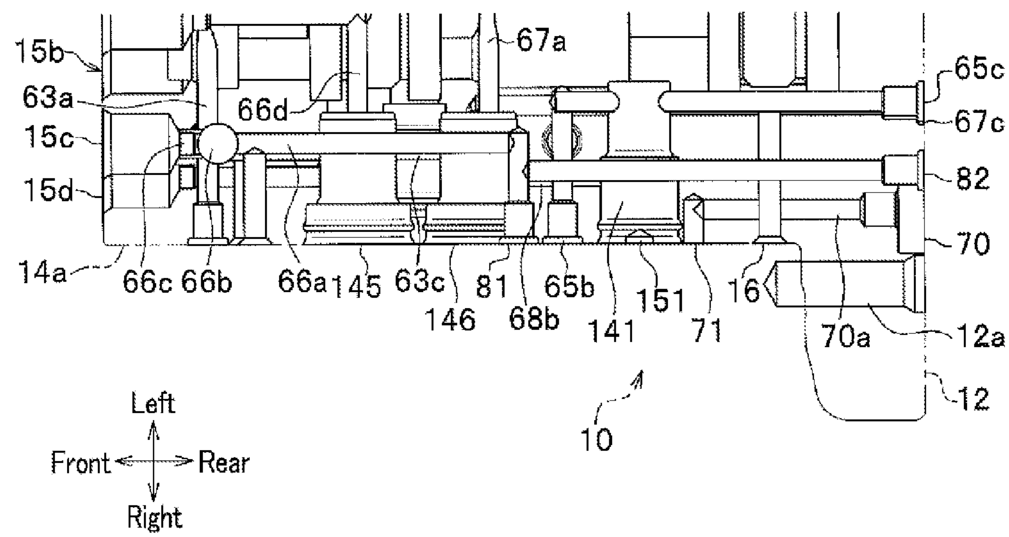

If it is assumed that the valve mounting through hole 141 does not have the hollow part 30 as shown in FIG. 21B, when a valve and a sensor having different sizes are arranged for the valve mounting through hole 141 and the sensor mounting through hole 145, a difference in the flow passage formation positions occurs. It is necessary to additionally form two lateral holes 81, 82 to provide communication between them. Accordingly, processing the lateral holes 81, 81 are troublesome and this results in increase in the number of the flow passage, so that a degree of freedom in lay outing the flow passages.

On the other hand, in the present invention, because the valve mounting through hole 141 and the sensor mounting through hole 145 are connected by one hole, i.e., the first lateral hole 66*a*, it is sufficient to process a minimum number of the flow passages, which enhances a degree of freedom in layout of the flow passages.

According to the present embodiment, formation of the hollow parts 30, 30 allow the circumferential surface 32 facing the lower outer circumferential surface 267 of the coil 26 to be simply formed, so that a productionability is enhanced.

Further, the normally open cutoff valve 5 and the normally closed cut-off valve 6 are arranged on one side (lower side) and the normally open cutoff valve 4 and the pressure sensor 7 are arranged on the other side (upper side) across the center axis O of the master cylinder 1, which are arranged to form corners of a quadrilateral. This makes the flow passage shorter than that made in the case where these are aligned in line with a higher density. As the result, the base 10 (the master cylinder apparatus A1) can be down-sized.

This results in simplification of the structure of the flow passages, in the structure including the stroke simulator 2 and the normally closed cut-off valve 6 for opening and closing the flow passage to the stroke simulator 2 to aim to down-size the base 10 (the master cylinder apparatus A1).

Further because the circumferential surface 32 of the hollow part 30 faces the lower outer circumferential surface 267 of the coil 26, heat of the coil 26 at a high temperature can be transmitted to the base 10 from the lower outer circumferential surface 267 through the circumferential surface 32. This allows the heat in the coil 26 to be absorbed by the base 10, so that the heat is radiated through the base 10.

Further, because the lower surface 269 of the coil 26 abuts the bottom surface 31 of the hollow part 30, the heat of the coil 26 at a high temperature can be directly transmitted to the base 10 through the lower surface 269 of the coil 26. Accordingly, the heat of the coil 26 can be further absorbed by the base 10, so that the heat is efficiently radiated through the base 10.

Further, because there is provided the elastic member 46 for biasing the coil 26 to the mounting surface 14*a* of the base 10 between the housing 20 and the coil 26, the lower surface 269 of the coil 26 surly abuts the mounting surface 14*a*, so that the heat of the base 10 is surly transmitted to the 10 through a bottom surface 369. This efficiently radiates the heat through the base 10.

Further, the clearance C is formed between the lower outer circumferential surface 267 and the circumferential surface 32 of the hollow part 30, when the housing 20 is assembled with the mounting surface, though there is a displace in the assemble position of the coil 26 in a easy, the clearance C can preferably absorb the displacement. Accordingly, the present invention is superior in an assembling characteristic.

Further, it is also possible to arrange a heat radiation gel having a heat radiation effect to fill the clearance C. Further, the heat radiation effect can be obtained by providing the hollow parts 30, 30 to eliminate the clearance C as well as positioning is possible when the coil 26 is held and assembled.

In the above-described embodiment, the hollow parts 30, 30 are provided for both the valve mounting through holes 141, 143. However, it is also possible to provide the hollow part 30 for at least one of the valve mounting through holes 141 to 143.

Further, because the connection hydraulic passages 9*c*, 9*c* are arranged in front of the normally open cutoff valves 4, 5, the normally closed cut-off valve 6, and the pressure sensors 7, 8, the connection hydraulic passages 9*c*, 9*d* do not interfere with the pressure sensors 7, 8, so that optimization of the flow passages and down-sizing the device can be provided.

Further, the flow passage to the stroke simulator 2 is arranged with shift to the left side from the center in the width direction of the master cylinder 1 when viewed in front of the base 10, and other flow passages are arranged with shift to the right side when viewed from the front. This provides optimization of the flow passage and down-sizing the device.

Figure 22:
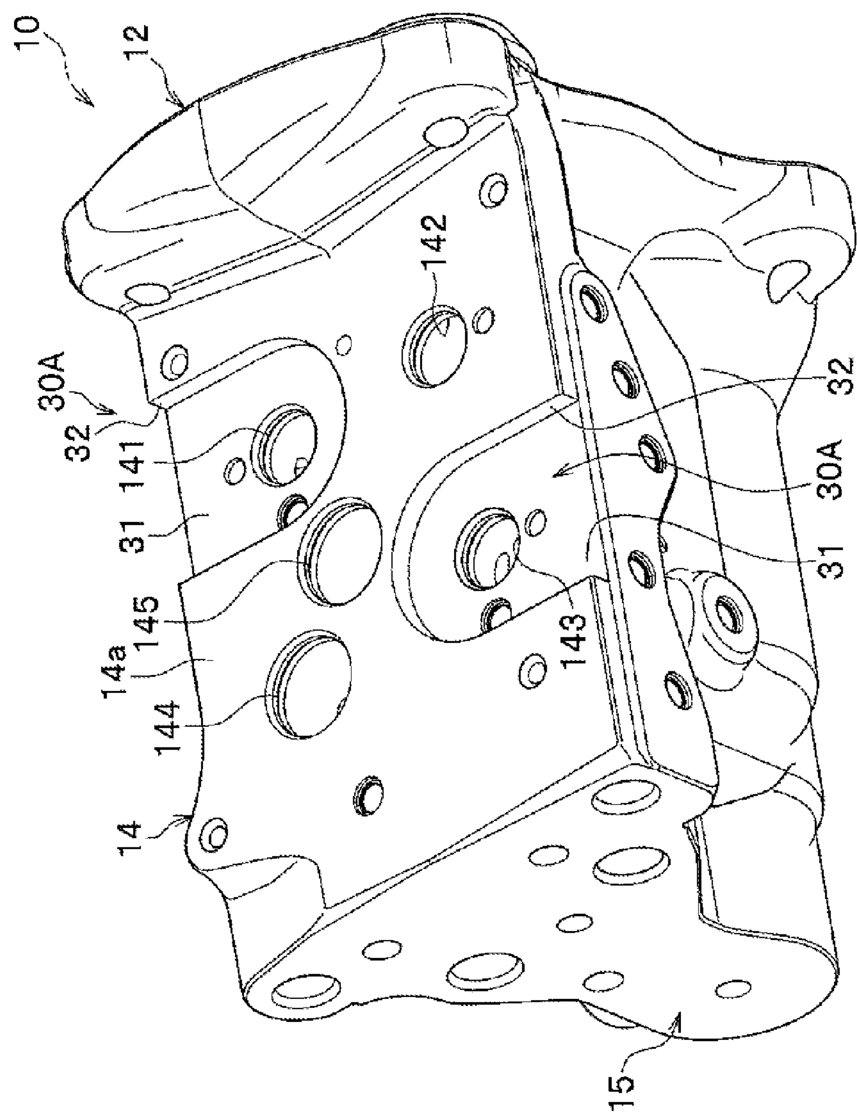
FIG. 22 is a perspective view showing a body according to a modification.

As shown in FIG. 22, around the valve mounting through holes 141, 143, hollow parts 30A, 30A may be provided so as to be continuous from the upper end and the lower end of the mounting surface 14*a*. Forming the hollow parts 30A, 30A provides thinning of the mounting surface 14*a*, so that a cost reduction can be provided.

Further, in the embodiment described above, providing the hollow part 30A, 30A forms the circumferential surface 32 (wall surface) facing the lower outer circumferential surface 267. However, the present invention is not limited to this, but it is also possible to form a wall surface in a rim shape protruding from the mounting surface 14*a* is arranged to face the lower outer circumferential surface 267 of the coil 26. This structure also preferably transmits the heat of the coil 26 to the base 10 through the wall surface in a rim shape.

The above-described embodiment has been described about the master cylinder apparatus A1 to which the circumferential surface 32 facing the lower outer circumferential surface 267 of the coil 26 is provided. However, the present invention is not limited to this, but may be preferably applied to the hydraulic pressure control device A3 as the brake hydraulic device.

Further, the arrangement places of the normally open cutoff valves 4, 5, the normally closed cut-off valve 6, and the pressure sensors 7, 8 can be appropriately changed in accordance with a relation between the main hydraulic passages 9*a*, 9*b* and the locations of the stroke simulator 2.

DESCRIPTION OF REFERENCE SYMBOLS

1 master cylinder
2 stroke simulator
4, 5 normally open cutoff valve (solenoid valve)
6 normally close cut-off valve (solenoid valve)
7,8 pressure sensor
9*a*, 9*b* main hydraulic passage
10 base
20 housing
26 coil (drive coil)
30, 30A hollow part
31 bottom surface
32 circumferential surface
41-43 valve insertion hole
46 elastic member (biasing means)
267 lower outer circumferential surface (outer circumferential surface)
A1 master cylinder apparatus
C clearance
O center axis
P brake pedal (brake operator)

The invention claimed is:

1. A master cylinder apparatus, including a base member, to which an operation of a brake operator is input, the base member having a plurality of flow passages formed therein for a brake fluid, said master cylinder apparatus comprising:

a cylinder unit formed as an integral part of the base member;

a master cylinder that is provided inside of the cylinder unit of the base member and which is configured to generate a fluid pressure when the operation of the brake operator is input thereto;

a stroke simulator disposed inside of the base member and arranged in parallel to the master cylinder, the stroke simulator configured to apply an operation reaction force of the brake operator to the brake operator;

three solenoid valves that are mounted on one surface of the base member situated on a side of the base member spaced away from the cylinder unit, said solenoid valves being operable to selectively open and close the flow passages, wherein two of the solenoid valves are arranged symmetrically across a center axis extending parallel to an axial direction of the master cylinder when the master cylinder apparatus is viewed from a direction perpendicular to the one surface of the base member;

the master cylinder apparatus further comprising two pressure sensors for detecting brake fluid pressures in the flow passages, the pressure sensors mounted on the one surface of the base member, wherein the three solenoid valves and one of the pressure sensors are arranged to form corners of a quadrilateral, and the other pressure sensor is arranged inside of the quadrilateral.

2. The master cylinder apparatus as claimed in claim 1, wherein the master cylinder comprises a tandem type of master cylinder, and wherein the two solenoid valves for the master cylinder are configured to open and close two main flow passages connected to the master cylinder.

3. The master cylinder apparatus as claimed in claim 1, wherein the one surface of the base member includes three valve mounting holes corresponding to the number of the solenoid valves, and wherein a hollow part is provided around at least one of the valve mounting holes to face an outer circumferential surface of a coil provided for driving the solenoid valve on the one surface of the base member.

4. The master cylinder apparatus as claimed in claim 1, wherein two of the solenoid valves are operable to selectively open and close respective connections between a main hydraulic passage and connecting hydraulic passages, and the third solenoid valve is provided for selectively opening and closing a flow passage to the stroke simulator.

5. A master cylinder apparatus, including a base member, to which an operation of a brake operator is input, the base member having including a plurality of flow passages formed therein for a brake fluid therein, said master cylinder apparatus comprising:

a cylinder unit formed as an integral part of the base member;

a master cylinder that is provided inside of the cylinder unit of the base member and which is configured to generate a fluid pressure when the operation of the brake operator is input thereto;

a stroke simulator disposed inside of the base member and arranged in parallel to the master cylinder, the stroke simulator configured to apply an operation reaction force of the brake operator to the brake operator;

at least two solenoid valves that are mounted on one surface of the base member on a side of the base member spaced away from the cylinder unit, said solenoid valves being operable to selectively open and close the flow passages, wherein one of the solenoid valves is provided for selectively opening and closing a flow passage to the stroke simulator, and wherein the two solenoid valves are arranged symmetrically across a center axis extending parallel to an axial direction of the master cylinder when the master cylinder apparatus is viewed from a direction perpendicular to the one surface of the base member, with one of the solenoid valves disposed above the center axis, and another of the solenoid valves disposed below the center axis.

* * * * *